United States Patent
Kato et al.

(10) Patent No.: US 7,894,315 B2
(45) Date of Patent: Feb. 22, 2011

(54) OPTICAL DISK, RECORDING METHOD, RECORDING MEDIUM, AND OPTICAL DISK UNIT, FOR RECORDING INFORMATION ON MULTILAYER OPTICAL DISK

(75) Inventors: Masaki Kato, Kanagawa (JP); Katsuyuki Yamada, Kanagawa (JP); Kazunori Ito, Kanagawa (JP); Michiaki Shinotsuka, Kanagawa (JP); Eiko Hibino, Kanagawa (JP); Masaru Shinkai, Kanagawa (JP); Hiroyoshi Sekiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 676 days.

(21) Appl. No.: 10/582,481

(22) PCT Filed: May 25, 2006

(86) PCT No.: PCT/JP2006/310940
§ 371 (c)(1),
(2), (4) Date: Aug. 21, 2006

(87) PCT Pub. No.: WO2006/095932
PCT Pub. Date: Sep. 14, 2006

(65) Prior Publication Data
US 2008/0068948 A1 Mar. 20, 2008

(30) Foreign Application Priority Data
May 26, 2005 (JP) .............................. 2005-153872

(51) Int. Cl.
*G11B 7/00* (2006.01)
(52) U.S. Cl. ...................................... 369/47.53; 369/94
(58) Field of Classification Search ............... 369/13.25, 369/53.24
See application file for complete search history.

(56) References Cited

U.S. PATENT DOCUMENTS 5,473,614 A * 12/1995 Hayashi ....................... 714/701

(Continued)

FOREIGN PATENT DOCUMENTS

CH 1397067 2/2003

(Continued)

OTHER PUBLICATIONS

"Data Interchange on 120 mm and 80 mm Optical Disk Using +RW Format—Capacity: 4,7 and 1,46 Gbytes per side (Recording speed up to 4X)" Standard ECMA-337, 2nd Edition/ Dec. 2003, pp. 1-121.
Republic of China Search Report, 2006/80000557.9, May 8, 2009.

*Primary Examiner* — Hoa T Nguyen
*Assistant Examiner* — Mark L Fischer
(74) *Attorney, Agent, or Firm* — Dickstein Shapiro LLP

(57) ABSTRACT

A method of recording information using a laser on a multi-layer optical disk having a plurality of recording layers is provided. The plurality of recording layers include a first recording layer and a second recording layer adjacent the first recording layer. The first recording layer is provided with a first test writing area to be used for calibration of write power, and the second recording layer is provided with a second test writing area to be used for calibration of write power. The disk is arranged so that a first region of the first test writing area is superposed with a second region of the second test writing area when considered in the direction in which the laser is arranged to irradiate. The method comprises, if the second region of the second test writing area is unrecorded, recording data in the second region of the second test writing area, thereby converting the second region of the second test writing area into a recorded state; and once the second region of the second test writing area has been converted into a recorded state, performing test writing in the first region of the first test writing area.

8 Claims, 15 Drawing Sheets

U.S. PATENT DOCUMENTS

| | | | |
|---|---|---|---|
| 6,031,803 A * | 2/2000 | Kubota et al. | 369/53.26 |
| 6,592,958 B2 | 7/2003 | Nakamura et al. | |
| 7,035,185 B2 | 4/2006 | Watabe | |
| 7,376,058 B2 * | 5/2008 | Narumi et al. | 369/47.53 |
| 7,436,743 B2 * | 10/2008 | Kubo et al. | 369/47.53 |
| 2002/0085462 A1 * | 7/2002 | Spruit | 369/47.53 |
| 2002/0136122 A1 | 9/2002 | Nakano | |
| 2003/0043712 A1 | 3/2003 | Nakamura et al. | |
| 2003/0185121 A1 | 10/2003 | Narumi et al. | |
| 2003/0214902 A1 | 11/2003 | Yamada et al. | |
| 2003/0227850 A1 | 12/2003 | Kato et al. | |
| 2004/0052176 A1 | 3/2004 | Narumi et al. | |
| 2004/0085880 A1 | 5/2004 | Katoh et al. | |
| 2004/0114488 A1 | 6/2004 | Sawada et al. | |
| 2004/0115559 A1 | 6/2004 | Kato et al. | |
| 2004/0161700 A1 * | 8/2004 | Abe et al. | 430/270.13 |
| 2004/0213122 A1 | 10/2004 | Yamada et al. | |
| 2005/0013216 A1 * | 1/2005 | Kim et al. | 369/47.5 |
| 2005/0013223 A1 | 1/2005 | Lee | |
| 2005/0078587 A1 | 4/2005 | Narumi et al. | |
| 2005/0195711 A1 * | 9/2005 | Lee | 369/47.53 |
| 2005/0226116 A1 | 10/2005 | Kubo | |
| 2005/0270935 A1 | 12/2005 | Lee | |
| 2006/0018635 A1 | 1/2006 | Kobayashi | |
| 2006/0153035 A1 * | 7/2006 | Eguchi et al. | 369/47.53 |
| 2006/0181983 A1 | 8/2006 | Martens et al. | |
| 2009/0059748 A1 * | 3/2009 | Van Der Vleuten et al. | 369/47.53 |

FOREIGN PATENT DOCUMENTS

| | | |
|---|---|---|
| EP | 1-244-096 | 9/2002 |
| EP | 1 318 509 | 6/2003 |
| EP | 1-575-035 | 9/2005 |
| EP | 1-577-884 | 9/2005 |
| JP | 10-055541 | 2/1998 |
| JP | 2000-311346 | 11/2000 |
| JP | 2001-052337 | 2/2001 |
| JP | 2003-030842 | 1/2003 |
| JP | 2004-310995 | 11/2004 |
| JP | 2005-11404 | 1/2005 |
| JP | 2005-174527 | 6/2005 |
| JP | 2006-031862 | 2/2006 |
| WO | WO 02/47072 | 6/2002 |
| WO | WO-2004/057585 | 7/2004 |
| WO | WO-2004/086393 | 10/2004 |
| WO | WO 2004/114289 | 12/2004 |
| WO | WO-2005-050631 | 6/2005 |
| WO | WO 2006048810 A1 * | 5/2006 |

* cited by examiner

ENTRANCE SURFACE

LASER LIGHT

FIG.6

| PARAMETER | L0 | L1 |
|---|---|---|
| OPTIMUM WRITE POWER (Pw) | 42mW | 50mW |
| Pe/Pw | 0.4 | 0.43 |
| Tmp | 0.56 | 0.63 |
| Ttop | 0.50 | 0.56 |
| dTtop | 0.00 | 0.00 |
| T3 | 0.75 | 0.81 |
| dTtop,3 | −0.13 | −0.13 |
| dTera,3 | 0.25 | 0.13 |
| dTtop,4 | 0.00 | 0.00 |
| dTera,E | 0.38 | 0.38 |
| dTtop,5 | 0.00 | 0.00 |
| dTlp,o | 0.00 | 0.06 |
| dTera,o | 0.38 | 0.38 |

OPTICAL DISK, RECORDING METHOD, RECORDING MEDIUM, AND OPTICAL DISK UNIT, FOR RECORDING INFORMATION ON MULTILAYER OPTICAL DISK

TECHNICAL FIELD

The present invention relates generally to optical disks, recording methods, recording media, and optical disk units, and more particularly to an optical disk having multiple layers on which information is rewritable (information rewritable layers), a method of recording information on the optical disk, an optical disk unit capable of recording information on the optical disk, and a recording medium on which a program employed in the optical disk unit is recorded.

BACKGROUND ART

In recent years, with progress in digital technology and an improvement in data compression techniques, optical disks such as DVDs (digital versatile disks) have drawn attention as media for recording information such as music, movies, photographs, and computer software (hereinafter also referred to as "contents"). As optical disks have become lower in price, optical disk units employing optical disks as media for recording information have become widely used.

In the optical disk unit, information is recorded on an optical disk by forming a minute laser light spot on the recording surface of the optical disk on which a spiral track or concentric tracks are formed, and information is reproduced from the optical disk based on reflected light from the recording surface. An optical pickup unit is provided in the optical disk unit in order to emit laser light onto the recording surface of the optical disk and receive reflected light from the recording surface.

In general, the optical pickup unit includes an optical system, a photodetector, and a lens drive unit. The optical system includes an objective lens. The optical system guides a light beam emitted from a light source to the recording surface of the optical disk, and guides a returning light beam reflected from the recording surface to a predetermined light-receiving position. The photodetector is disposed at the light-receiving position. The lens drive unit drives the objective lens in the directions of its optical axis (hereinafter also referred to as "focus directions") and in the directions perpendicular to the tangential directions of the tracks (hereinafter also referred to as "tracking directions"). The photodetector outputs a signal including not only the reproduced information of data recorded on the recording surface, but also information necessary to control the position of the objective lens (servo information).

Information is recorded on the optical disk based on the length of each of a mark and a space different in reflectivity from each other, and their combination.

For example, when a mark is formed in rewritable optical disks such as DVD-RW (DVD-rewritable) and DVD+RW (DVD+rewritable) disks including a special alloy in their recording layers, the special alloy is rapidly cooled after being heated to a first temperature so as to be in an amorphous state. On the other hand, when a space is formed, the special alloy is gradually cooled after being heated to a second temperature (lower than the first temperature) so as to be in a crystalline state. As a result, the reflectivity is lower in the mark than in the space. Such control of special alloy temperature is performed by controlling the light emission power of laser light. At the time of forming marks in particular, the pulse shape of light emission power is set based on a rule (method) concerning the pulse shape of light emission power, etc., called a write strategy, in order to reduce variation in heat distribution due to preceding and subsequent marks and spaces.

In the optical disk unit, at the time of recording, an optimum write (recording) power is obtained by performing test writing in a preset test writing area called PCA (Power Calibration Area) before writing information in order that a mark and a space of target length are formed at a target position on the optical disk (see, for example, ECMA-337 Data Interchange on 120 mm and 80 mm Optical Disk using +RW Format —Capacity: 4.7 and 1.46 Gbytes per Side, December 2003). This operation is called OPC (Optimum Power Control).

The contents tend to increase in quantity year by year, so that a further increase in the recording capacity of optical disks is expected. Providing multiple recording layers is considered as means for increasing the recording capacity of optical disks, and lots of efforts are being made to develop optical disks having multiple recording layers (hereinafter also referred to as "multilayer disks") and optical disk units to access the multilayer disks. It is also important to obtain an appropriate write power in the multilayer disks, and a variety of proposals have been made regarding OPC (see, for example, Japanese Laid-Open Patent Application No. 2004-310995).

However, in rewritable multilayer disks, which are not yet commercially available, for example, higher recording rates may cause variations in recording quality even when recording is performed with an optimum write power obtained by OPC.

DISCLOSURE OF THE INVENTION

Accordingly, it is a general object of the present invention to provide an optical disk in which the above-described disadvantages are eliminated.

A more specific object of the present invention is to provide an optical disk with multiple rewritable recording layers on which disk recording can be stably performed.

Another more specific object of the present invention is to provide a recording method and an optical disk unit that make it possible to perform recording on the optical disk with stable recording quality.

Yet another more specific object of the present invention is to, provide a recording medium on which recorded is a program to be executed by the controlling computer of the optical disk unit, the program making it possible to perform recording on the optical disk with stable recording quality.

According to a first aspect of the invention, there is provided a method of recording information using a laser on a multilayer optical disk having a plurality of recording layers, the plurality of recording layers including a first recording layer and a second recording layer, the second recording layer being a recording layer adjacent the first recording layer, the first recording layer having a first test writing area to be used for calibration of write power and the second recording layer having a second test writing area to be used for calibration of write power, wherein a first region of the first test writing area is superposed with a second region of the second test writing area when considered in the direction in which the laser is arranged to irradiate, the method comprising:

if the second region of the second test writing area is unrecorded, recording data in the second region of the second test writing area, thereby converting the second region of the second test writing area into a recorded state; once the second region of the second test writing area has been converted into a recorded state, performing test writing in the first region of the first test writing area.

The second recording layer can be the next recording layer with respect to the first recording layer in the direction in which the laser is arranged to irradiate.

In addition, the optical disk can include a third recording layer, the third recording layer being the next recording layer with respect to the first recording layer in the opposite direction to that in which the laser is arranged to irradiate, the third recording layer having a third test writing area to be used for calibration of write power, wherein a third region of the third test writing area is superposed with the first region of the first test writing area when considered in the direction in which the laser is arranged to irradiate. In such embodiments, the method comprises: if the third region of the third test writing area is unrecorded, recording data in the third region of the third test writing area, thereby converting the third region of the third test writing area into a recorded state; once the third region of the third test writing area has been converted into a recorded state, performing said test writing in the first region of the first test writing area.

In some embodiments, before performing the test writing in the first region of the first test writing area, if the first region of the first test writing area is unrecorded, the method comprises: recording data in the first region of the first test writing area, thereby converting the first region of the first test writing area into a recorded state; and then clearing the first region of the first test writing area.

In some embodiments, before performing the test writing in the first region of the first test writing area, the method comprises clearing the first region of the first test writing area.

The clearing of the first region of the first test writing area can comprise performing an erasure operation to make the first region unrecorded.

For the first region of the first test writing area, or the second region of the second test writing area, or the third region of the third test writing area, the respective step of recording data in the region thereby converting the region into a recorded state comprises performing an operation to make the region logically zero.

According to a second aspect of the invention, there is provided an apparatus arranged to record information to a multilayer optical disk having a plurality of recording layers using a laser, the plurality of recording layers including a first recording layer and a second recording layer, the second recording layer being a recording layer adjacent the first recording layer, the first recording layer having a first test writing area to be used for calibration of write power and the second recording layer having a second test writing area to be used for calibration of write power, wherein a first region of the first test writing area is superposed with a second region of the second test writing area when considered in the direction in which the laser is arranged to irradiate, wherein: if the second region of the second test writing area is unrecorded, the apparatus is arranged to record data in the second region of the second test writing area, thereby converting the second region of the second test writing area into a recorded state; once the second region of the second test writing area has been converted into a recorded state, the apparatus is arranged to perform test writing in the first region of the first test writing area.

The second recording layer can be the next recording layer with respect to the first recording layer in the direction in which the laser is arranged to irradiate.

In addition, the optical disk can include a third recording layer, the third recording layer being the next recording layer with respect to the first recording layer in the opposite direction to that in which the laser is arranged to irradiate, the third recording layer having a third test writing area to be used for calibration of write power, wherein a third region of the third test writing area is superposed with the first region of the first test writing area when considered in the direction in which the laser is arranged to irradiate, wherein: if the third region of the third test writing area is unrecorded, the apparatus is arranged to record data in the third region of the third test writing area, thereby converting the third region of the third test writing area into a recorded state; once the third region of the third test writing area has been converted into a recorded state, the apparatus is arranged to perform said test writing in the first region of the first test writing area.

In some embodiments, before performing the test writing in the first region of the first test writing area, if the first region of the first test writing area is unrecorded, the apparatus is arranged to: record data in the first region of the first test writing area, thereby converting the first region of the first test writing area into a recorded state; and then to clear the first region of the first test writing area.

In some embodiments, before performing the test writing in the first region of the first test writing area, the apparatus is arranged to clear the first region of the first test writing area.

The clearing of the first region of the first test writing area can comprise performing an erasure operation to make the first region unrecorded.

For the first region of the first test writing area, or the second region of the second test writing area, or the third region of the third test writing area, the apparatus is arranged such that the respective recording of data in the region thereby converting the region into a recorded state comprises performing an operation to make the region logically zero.

One or more of the above objects of the present invention are achieved by a single-sided multilayer optical disk including a plurality of information rewritable recording layers each having a spiral track or concentric tracks formed thereon, wherein a test writing area to be used for calibration of write power is provided in each of the recording layers, and the test writing areas of adjacent two of the recording layers are superposed at least partly on each other in a view from a direction of incidence of a light beam.

An optical disk according to one embodiment of the present invention allows an optical disk unit in which the optical disk is set to perform positioning swiftly at the time of performing test writing in one recording layer after another, and accordingly, to calibrate write power in each recording layer in a short period of time. As a result, it is possible to perform stable recording even if the optical disk has multiple rewritable recording layers.

One or more of the above objects of the present invention are also achieved by a method of recording information on a single-sided multilayer optical disk according to one embodiment of the present invention, the method including the step of, before performing test writing in a first one of the test writing areas of the recording layers in the optical disk except the recording layer closest to a light beam entrance surface, recording data in a second one of the test writing areas adjacent to the first one of the test writing areas on a light beam entrance surface side thereof, thereby converting the second one of the test writing areas into a recorded state.

According to one embodiment of the present invention, before performing test writing in a first one of the test writing areas of recording layers in an optical disk except the recording layer closest to a light beam entrance surface, a second one of the test writing areas adjacent to the first one of the test writing areas on its light beam entrance surface side is converted into a recorded state. Accordingly, it is possible to determine an optimum write power matching a situation where user data is actually recorded, so that it is possible to perform recording with stable recording quality.

One or more of the above objects of the present invention are also achieved by a method of recording information on a single-sided multilayer optical disk according to one embodiment of the present invention, the method including the step of, before performing test writing in a first one of the test writing areas of the recording layers in the optical disk except the recording layer most remote from a light beam entrance surface, recording data in a second one of the test writing areas adjacent to the first one of the test writing areas on a side thereof opposite from the light beam entrance surface, thereby converting the second one of the test writing areas into a recorded state.

According to one embodiment of the present invention, before performing test writing in a first one of the test writing areas of recording layers in an optical disk except the recording layer most remote from a light beam entrance surface, a second one of the test writing areas adjacent to the first one of the test writing areas on the opposite side from the light beam entrance surface is converted into a recorded state. Accordingly, it is possible to suppress the adverse effect of so-called interlayer crosstalk, so that it is possible to perform recording with stable recording quality.

One or more of the above objects of the present invention are also achieved by a computer-readable recording medium on which recorded is a program for causing a computer to execute any of the above-described methods of recording information on a single-sided multilayer optical disk according to one embodiment of the present invention.

According to one embodiment of the present invention, when a program is loaded into a predetermined memory, and its start address is set in a program counter, the controlling computer of an optical disk unit, before performing test writing in a first one of the test writing areas of recording layers in an optical disk except the recording layer closest to a light beam entrance surface, changes a second one of the test writing areas adjacent to the first one of the test writing areas on its light beam entrance surface side into a recorded state. Alternatively, the controlling computer, before performing test writing in a first one of the test writing areas of the recording layers except the recording layer most remote from a light beam entrance surface, may change a second one of the test writing areas adjacent to the first one of the test writing areas on the opposite side from the light beam entrance surface into a recorded state. Thus, it is possible to cause the controlling computer of the optical disk unit to execute any of the above-described recording methods of recording information on the optical disk, so that it is possible to perform recording with stable recording quality.

One or more of the above objects of the present invention are also achieved by an optical disk unit capable of recording information on a single-sided multilayer optical disk according to one embodiment of the present invention, the optical disk unit including a memory, an optical pickup unit configured to emit a light beam onto the optical disk, a controlling computer, and a processing unit, wherein the memory stores a program for causing the controlling computer to execute any of the above-described methods of recording information on the optical disk; the controlling computer obtains an optimum recording condition for the optical disk in accordance with the program stored in the memory; and the processor unit records the information on the optical disk with the optimum recording condition through the optical pickup unit.

According to one embodiment of the present invention, the controlling computer of an optical disk unit executes a program, recorded in a memory, for causing the controlling computer to execute any of the above-described methods of recording the information on the optical disk, so that an optimum recording condition is obtained. A processing unit records the information on the optical disk with the optimum recording condition through an optical pickup unit. In this case, the controlling computer obtains an optimum recording condition whichever recording layer of the optical disk is to have information recorded therein. As a result, it is possible to perform recording on the optical disk with stable recording quality.

BRIEF DESCRIPTION OF THE DRAWINGS

Other objects, features and advantages of the present invention will become more apparent from the following detailed description when read in conjunction with the accompanying drawings, in which:

FIG. 6 is a table showing parameters of the write strategy according to the embodiment of the present invention;

BEST MODE FOR CARRYING OUT THE INVENTION

A description is given below, with reference to the accompanying drawings, of an embodiment of the present invention.

Figure 1:
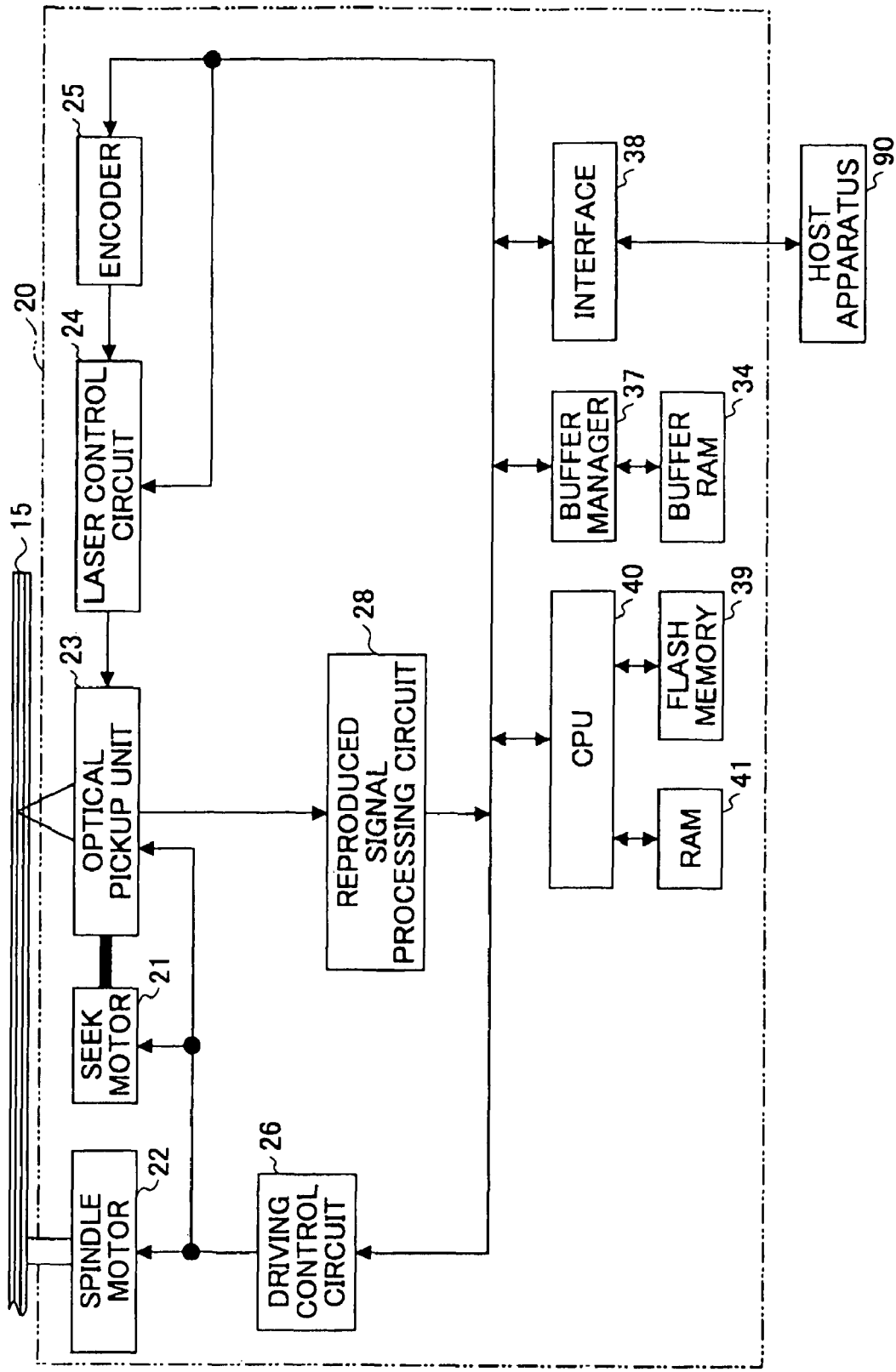
FIG. 1 is a block diagram showing an optical disk unit according to an embodiment of the present invention.

FIG. 1 is a block diagram showing an optical disk unit 20 according to the embodiment of the present invention.

The optical disk unit 20 includes a spindle motor 22 to rotate an optical disk 15 according to the embodiment of the present invention; an optical pickup unit 23; a seek motor 21 to drive the optical pickup unit 23 in the radial directions of the optical disk 15; a laser control circuit 24, an encoder 25, a drive control circuit 26, a reproduced signal processing circuit 28, a buffer RAM 34, a buffer manager 37, an interface 38, a flash memory 39, a CPU 40, and a RAM 41. The arrows in FIG. 1 represent typical information and signal flows, and do not represent all the interconnections of the blocks. Further, in this embodiment, the optical disk unit 20 supports multilayer disks.

[Structure of Optical Disk 15]

Figure 2:
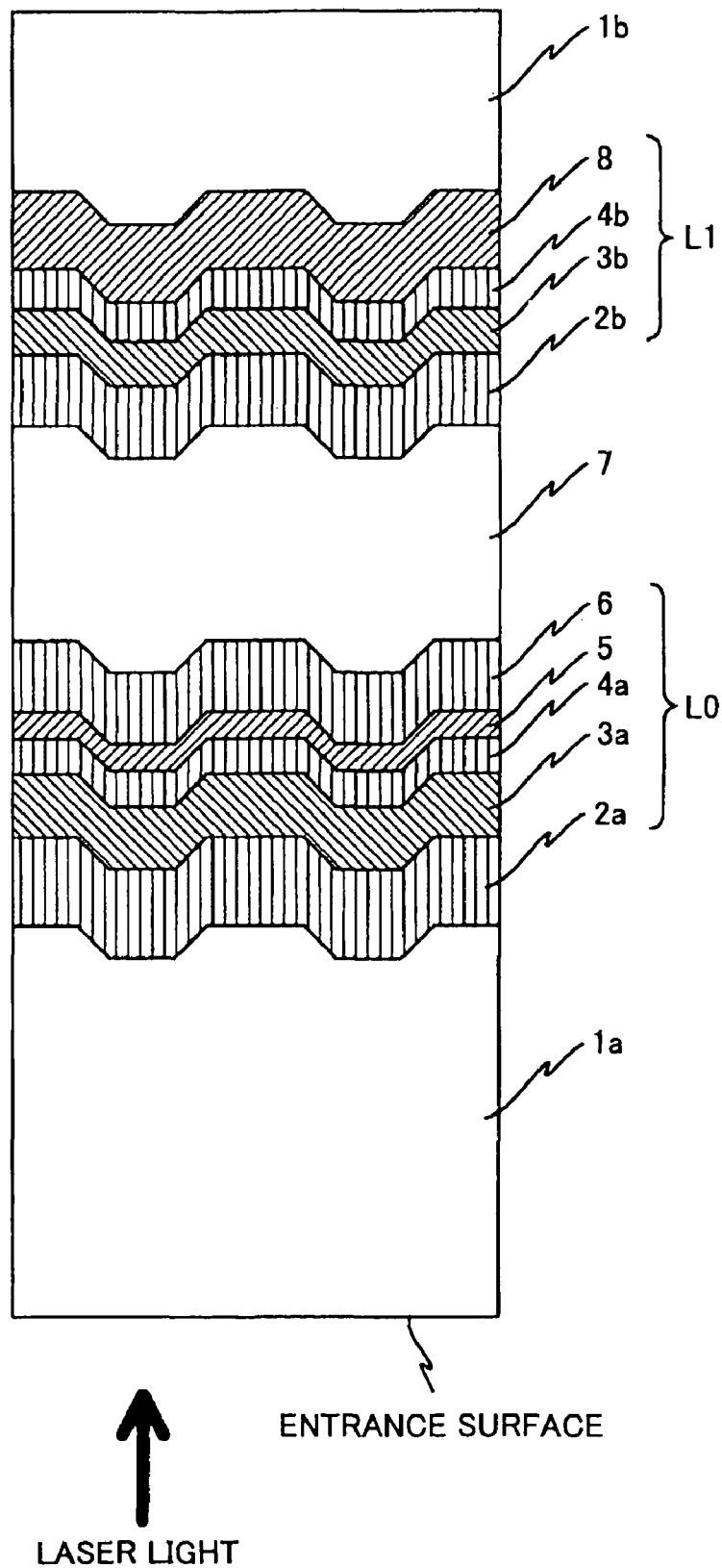
FIG. 2 is a diagram for illustrating a structure of an optical disk according to the embodiment of the present invention.

A light beam is made incident on or enters the optical disk 15 through one side thereof. By way of example, the optical disk 15 includes two rewritable recording layers. That is, the optical disk 15 is a single-sided double-layer disk. By way of example, as shown in FIG. 2, the optical disk 15 includes a substrate 1a, a layer L0, an adhesive layer 7, a layer L1, and a substrate 1b in this order of closeness to the light beam entrance surface. The incident light beam reaches the layer L1 through the substrate 1a, the layer L0, and the adhesive layer 7. Accordingly, the substrate 1a, the layer L0, and the adhesive layer 7 should have a predetermined transparency in the wavelength range of the incident light beam.

The layer L0 has a lower protection layer 2a, a recording layer 3a, an upper protection layer 4a, a semi-transparent layer 5, and an intermediate layer 6 in this order of closeness to the light beam entrance surface. Further, the layer L1 has a lower protection layer 2b, a recording layer 3b, an upper protection layer 4b, and a reflective layer 8 in this order of closeness to the light beam entrance surface. By way of example, the optical disk 15 is a disk of 120 mm in diameter. Further, by way of example, the optical disk 15 is an information recording medium belonging to the DVD system.

The substrate 1a is 0.565 mm in thickness. By way of example, polycarbonate is employed as the material of the substrate 1a.

The lower protection layer 2a has a film thickness of 200 nm. By way of example, a mixture of ZnS and $SiO_2$ is employed as the material of the lower protection layer 2a. Here, by way of example, the mixture ratio of ZnS to $SiO_2$ is 80:20 (molar ratio).

The recording layer 3a has a film thickness of 8 mm. By way of example, an In—Sb—Ge alloy is employed as the material of the recording layer 3a.

The upper protection layer 4a has a film thickness of 20 nm. By way of example, $SiO_2$ is employed as the material of the upper protection layer 4a.

The lower protection layer 2a and the upper protection layer 4a are provided in order to prevent thermal deformation and diffusion of the recording layer 3a.

The semi-transparent layer 5 has a film thickness of 8 nm. By way of example, Cu is employed as the material of the semi-transparent layer 5.

The intermediate layer 6 has a film thickness of 150 nm. By way of example, ITO is employed as the material of the intermediate layer 6. The intermediate layer 6 has the function of diffusing heat around the recording layer 3a with efficiency and of correcting light absorptance.

That is, the layer L0 is 386 nm in thickness.

The adhesive layer 7 is 50 μm in thickness. By way of example, an acryl-based UV-curable adhesive agent is employed as the material of the adhesive layer 7.

The lower protection layer 2b has a film thickness of 100 nm. By way of example, the same ZnS—$SiO_2$ mixture as that of the lower protection layer 2a is employed as the material of the lower protection layer 2b.

The recording layer 3b has a film thickness of 12 nm. That is, the recording layer 3b is thicker than the recording layer 3a. By way of example, a Ge—In—Sb—Te alloy is employed as the material of the recording layer 3b.

The upper protection layer 4b has a film thickness of 20 nm. By way of example, $SiO_2$ is employed as the material of the upper protection layer 4b.

The reflective layer 8 has a film thickness of 140 nm. By way of example, Ag is employed as the material of the reflective layer 8.

That is, the layer L1 is 272 nm in thickness.

The substrate 1b is 0.6 mm in thickness. By way of example, polycarbonate is employed as the material of the substrate 1b.

Part of a light beam incident on the optical disk 15 is reflected from the layer L0, and the remaining part of the light beam passes through the layer L0. The light beam passing through the layer L0 is reflected from the layer L1. Further, a spiral guide groove is formed in each of the layers L0 and L1.

[Method of Manufacturing Optical Disk 15]

(a) A spiral groove of a track pitch of 0.74 μm is formed on a first polycarbonate board of 0.565 mm in thickness serving as the substrate 1a. This groove wobbles at a period of 4.7 μm so that the period of a wobble signal is 1.22 μs at the reference velocity of 3.83 m/s. The wobble shape is partially phase-modulated. Address information, calibration information used to calibrate write (recording) power for writing onto the layer L0, and information on write power recommended for writing onto the layer L0 are stored in the phase-modulated part of the wobble shape.

(b) A film of a mixture of ZnS and $SiO_2$ to serve as the lower protection layer 2a is formed on the groove formed on the first polycarbonate board using a magnetron sputtering device. The mixture film is 200 nm in thickness. The film thickness is measured using ellipsometry and the fluorescent X-ray method together.

(c) In the same manner, an In—Sb—Ge alloy film to serve as the recording layer 3a is formed on the mixture film. The In—Sb—Ge alloy film is 8 nm in thickness.

(d) In the same manner, a $SiO_2$ film to serve as the upper protection layer 4a is formed on the In—Sb—Ge alloy film. The $SiO_2$ film is 20 nm in thickness.

(e) In the same manner, a Cu film to serve as the semi-transparent layer 5 is formed on the $SiO_2$ film. The Cu film is 8 nm in thickness.

(f) In the same manner, an ITO film to serve as the intermediate layer 6 is formed on the Cu film. The ITO film is 150 nm in thickness.

For convenience, the first polycarbonate board and these stacked layers of the ZnS—$SiO_2$ mixture film, the In—Sb—Ge alloy film, the $SiO_2$ film, the Cu film, and the ITO film on the first polycarbonate board are collectively referred to as an L0 substrate.

(g) The same groove as in (a) is formed on a second polycarbonate board of 0.6 mm in thickness serving as the substrate 1b. Here, address information, calibration information used to calibrate write (recording) power for writing onto the layer L1, and information on write power recommended for writing onto the layer L1 are stored in the phase-modulated part.

(h) A Ag film to serve as the reflective layer 8 is formed on the groove formed on the second polycarbonate board using a magnetron sputtering device. The Ag film is 140 nm in thickness.

(i) In the same manner, a $SiO_2$ film to serve as the upper protection layer 4b is formed on the Ag film. The $SiO_2$ film is 20 nm in thickness.

(j) In the same manner, a Ge—In—Sb—Te alloy film to serve as the recording layer 3b is formed on the SiO$_2$ film. The Ge—In—Sb—Te alloy film is 12 nm in thickness.

(k) In the same manner, a film of a mixture of ZnS and SiO$_2$ to serve as the lower protection layer 2b is formed on the Ge—In—Sb—Te alloy film. The mixture film is 100 nm in thickness.

For convenience, the second polycarbonate board and these stacked layers of the Ag film, the SiO$_2$ film, the Ge—In—Sb—Te alloy film, and the ZnS—SiO$_2$ mixture film on the second polycarbonate board are collectively referred to as an L1 substrate.

(l) A commercially available adhesive agent for DVDs is applied to the intermediate layer 6 of the L0 substrate and the lower protection layer 2b of the L1 substrate, and the L0 substrate and the L1 substrate are stuck together.

(m) The stuck L0 and L1 substrates are irradiated with ultraviolet rays from the L0 substrate side so that the adhesive agent is hardened. The layer of the adhesive agent is approximately 50 μm in thickness. The thickness of the adhesive agent layer is measured by a so-called interference method using a spectrophotometer. That is, here, the optical disk 15 is manufactured by the so-called inverted stack method.

[Initialization of Recording Layers]

Laser light of 810 nm wavelength is emitted onto and scans the recording layers 3a and 3b, so that each of the recording layers 3a and 3b is initialized. Here, by way of example, the light emission power is 700 mW for the recording layer 3a and 1600 mW for the recording layer 3b. A light spot in the recording layers 3a and 3b is shaped as an ellipse of 1 (μm)× 75 (μm), and the scanning velocity is 3.5 m/s. The directions of the shorter axis of the light spot coincide with the tangential directions of a track. Before initialization, the recording layers 3a and 3b are in an amorphous state and have high transmittance. Accordingly, in order to reduce time required for initialization, first, the recording layer 3b is initialized, and thereafter, the recording layer 3a is initialized. In this case, for example, the reflectance after initialization is 8.5% in the layer L0 and 7.5% in the layer L1.

[Calibration Information]

Calibration information employed to calibrate write power includes Pind, ρ, and γtarget (for example, see ECMA-337). Here, by way of example, Pind=33.6 mW, ρ=1.25, and γtarget=1.4 in the layer L0, and Pind=40 mW, ρ=1.25, and γtarget=1.5 in the layer L1.

[Write Strategy Information]

Figure 3A:
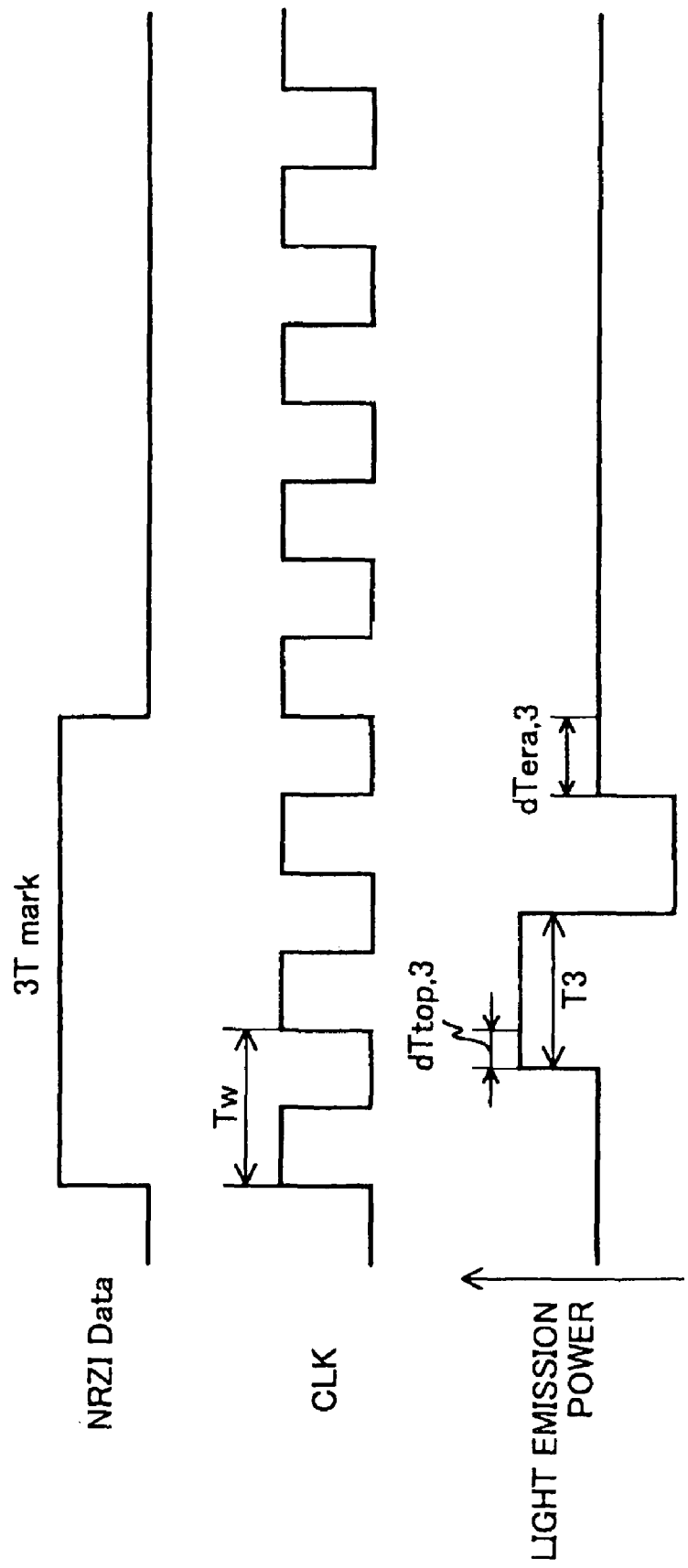
FIGS. 3A and 3B are diagrams for illustrating a write strategy according to the embodiment of the present invention.
Figure 3B:
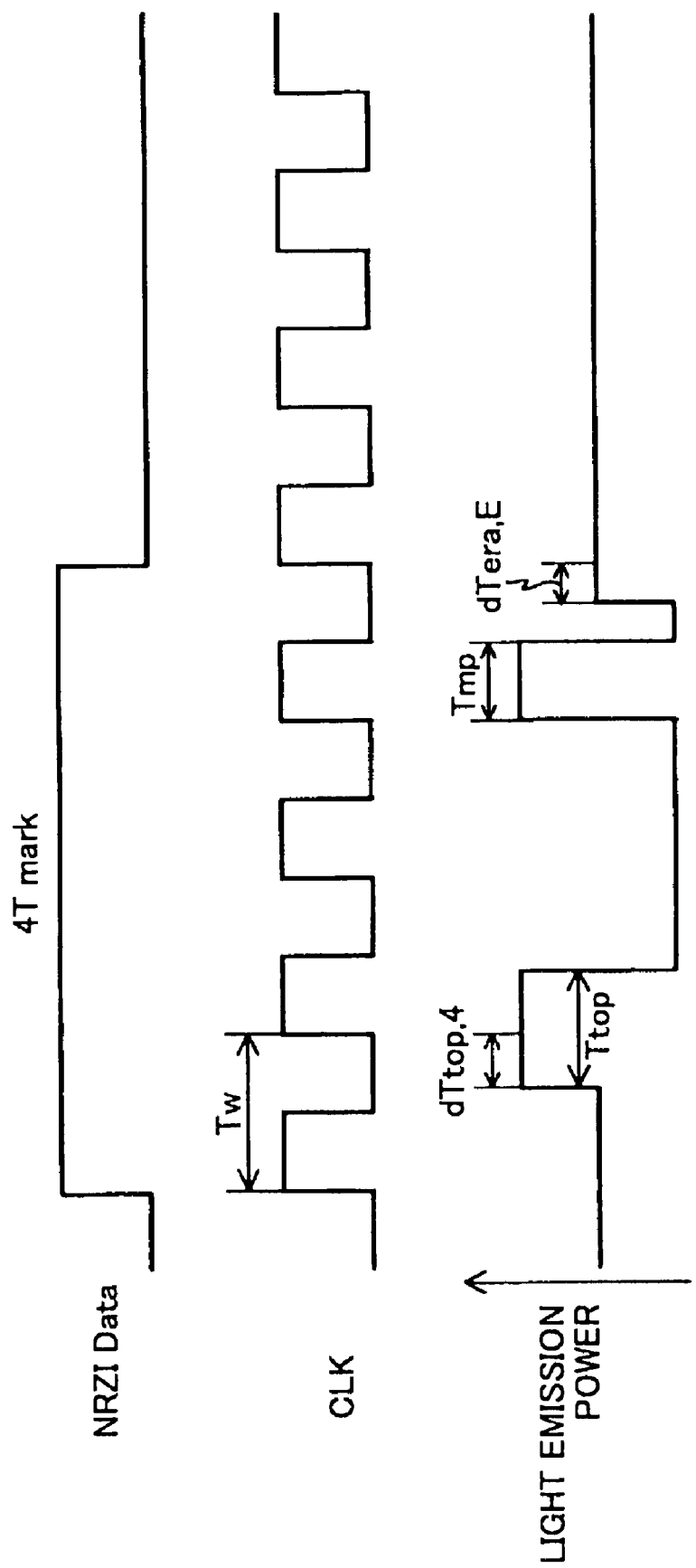
Figure 4A:
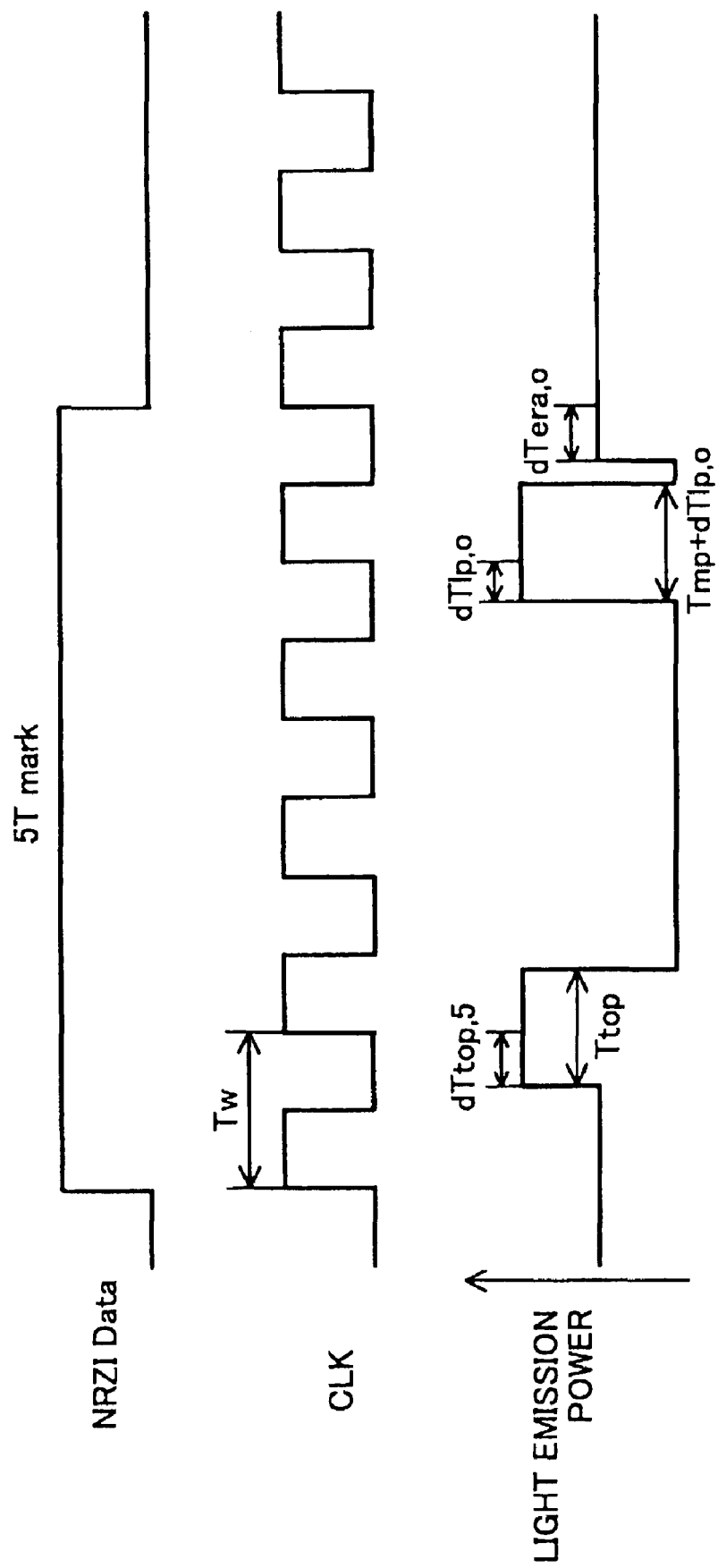
FIGS. 4A and 4B are additional diagrams for illustrating the write strategy according to the embodiment of the present invention.
Figure 4B:
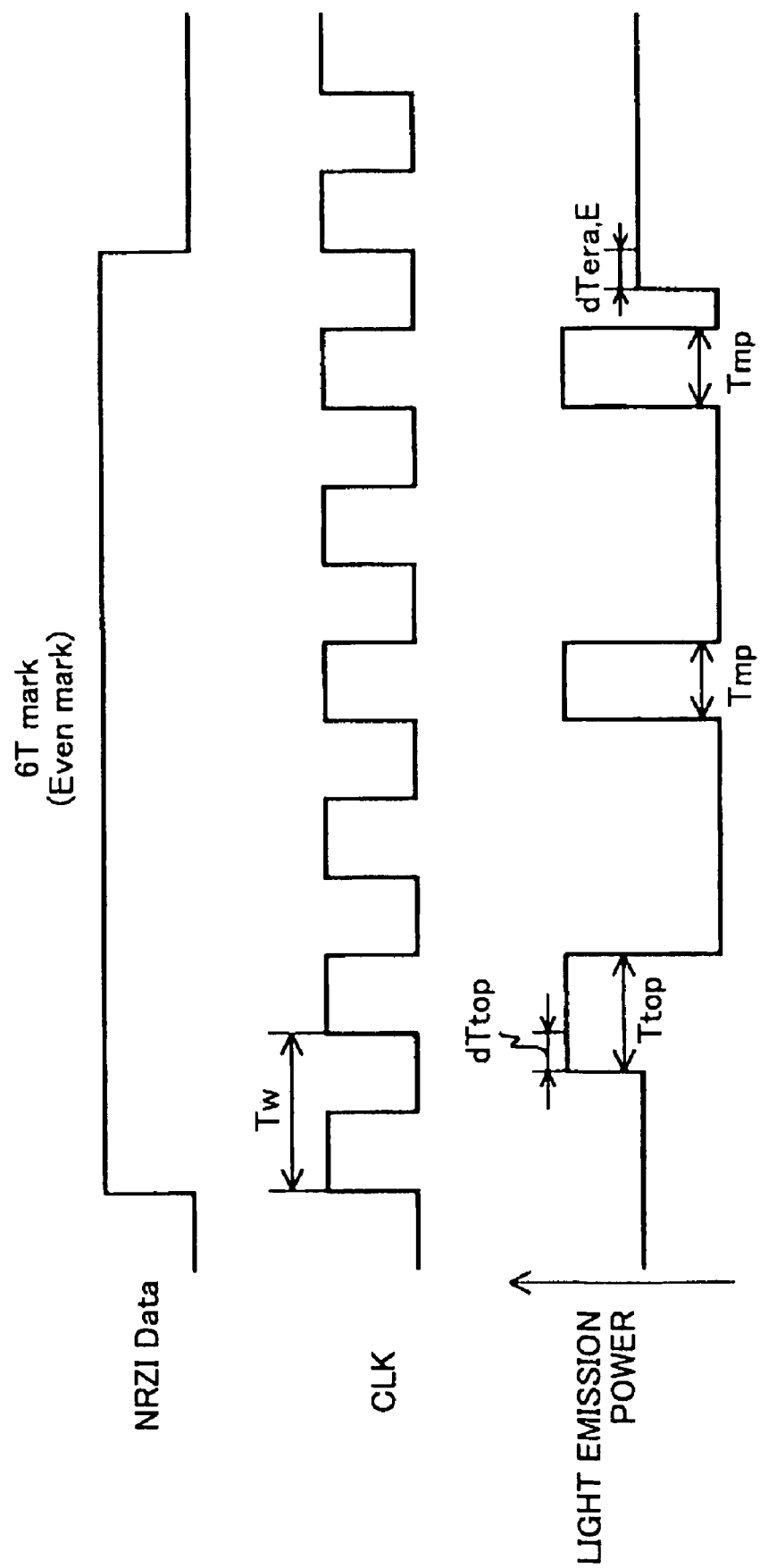
Figure 5:
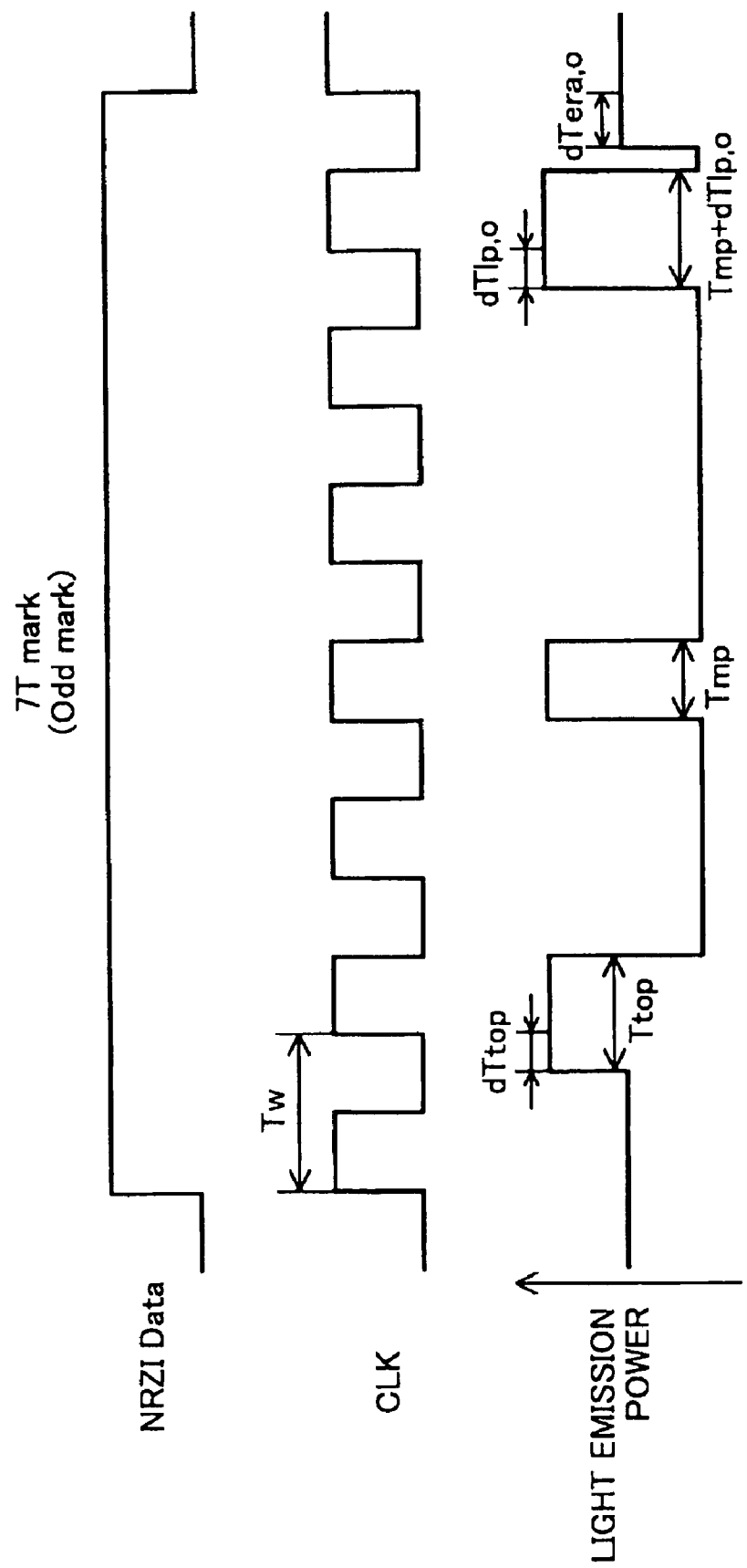
FIG. 5 is another diagram for illustrating the write strategy according to the embodiment of the present invention.

Write strategy information includes a variety of parameters defining a light emission waveform according to mark length nT (n=3 through 11, T is the period of a write channel clock). Here, by way of example, so-called 2T write strategy is employed as shown in FIGS. 3A through 6. FIG. 3A shows a light emission waveform at the time of formation of a 3T mark. FIG. 3B shows a light emission waveform at the time of formation of a 4T mark. FIG. 4A shows a light emission waveform at the time of formation of a 5T mark. FIG. 4B shows a light emission waveform at the time of formation of a 6T mark. For the marks of even multiples of T greater than the 6T mark, the same parameters as for the 6T mark are employed, and only the number of pulses of a pulse width Tmp (so-called intermediate heating pulses) is different. FIG. 5 shows a light emission waveform at the time of formation of a 7T mark. For the marks of odd multiples of T greater than the 7T mark, the same parameters as for the 7T mark are employed, and only the number of pulses of the pulse width Tmp (so-called intermediate heating pulses) is different. FIG. 6 is a table showing a value of each parameter.

[Disk Layout of Optical Disk 15]

Figure 7:
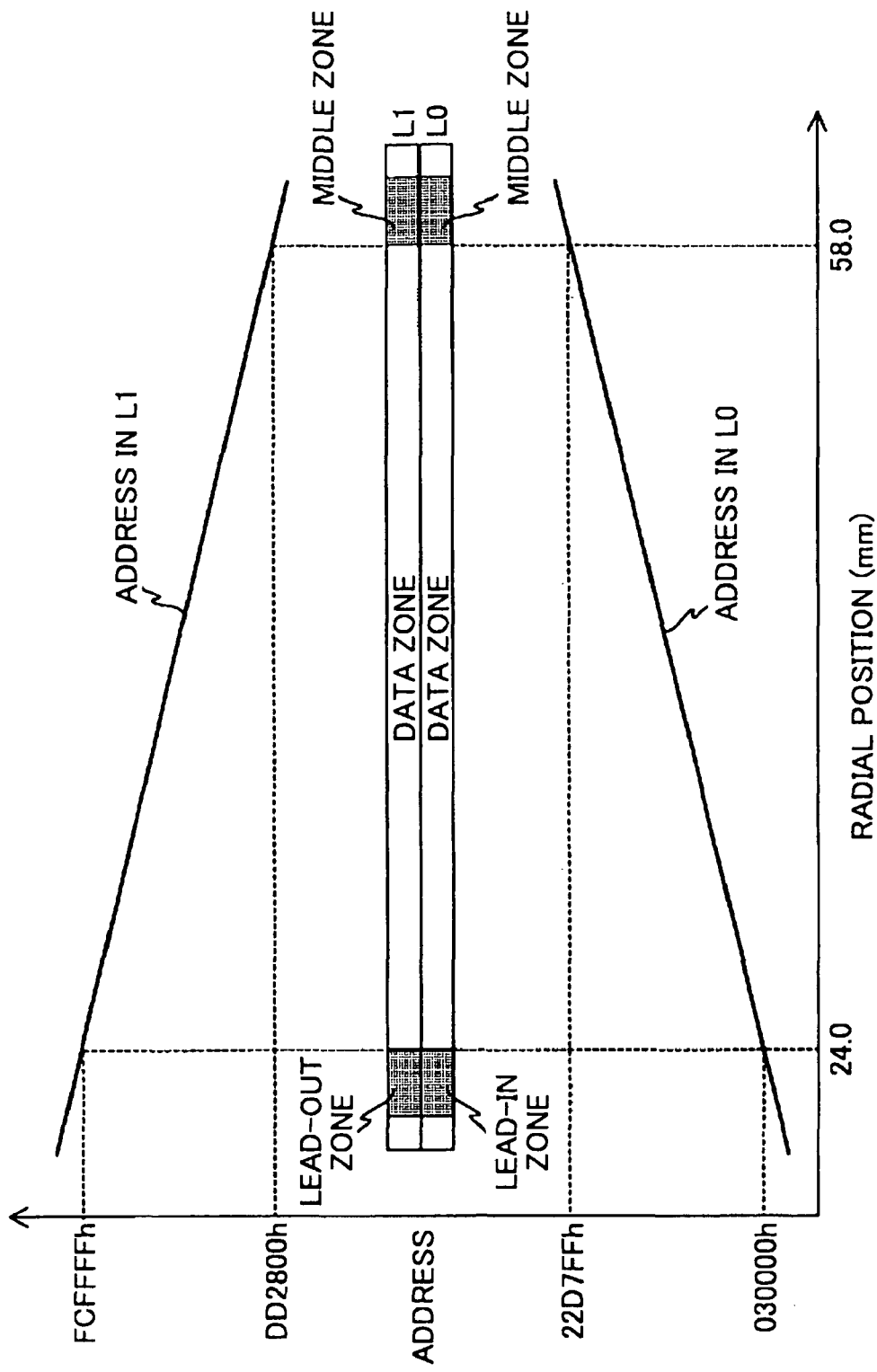
FIG. 7 is a diagram for illustrating a disk layout of the optical disk of FIG. 2 according to the embodiment of the present invention.

By way of example, the optical disk 15 supports a standard called opposite track path (OTP) as shown in FIG. 7.

That is, in the layer L0, a lead-in zone, a data zone, and a middle zone are provided in this order from the center to the edge of the optical disk 15. Meanwhile, in the layer L1, a middle zone, a data zone, and a lead-out zone are provided in this order from the edge to the center of the disk. The layer L0 is assigned physical addresses to successively increase from the lead-in zone to the middle zone. The layer L1 is assigned physical addresses to successively increase from the middle zone to the lead-out zone. Here, the start address and the end address of the data zone of the layer L0 are 030000h and 22D7FFh, respectively, and the start address and the end address of the data zone of the layer L1 are DD2800h and FCFFFFh, respectively.

Figure 8:
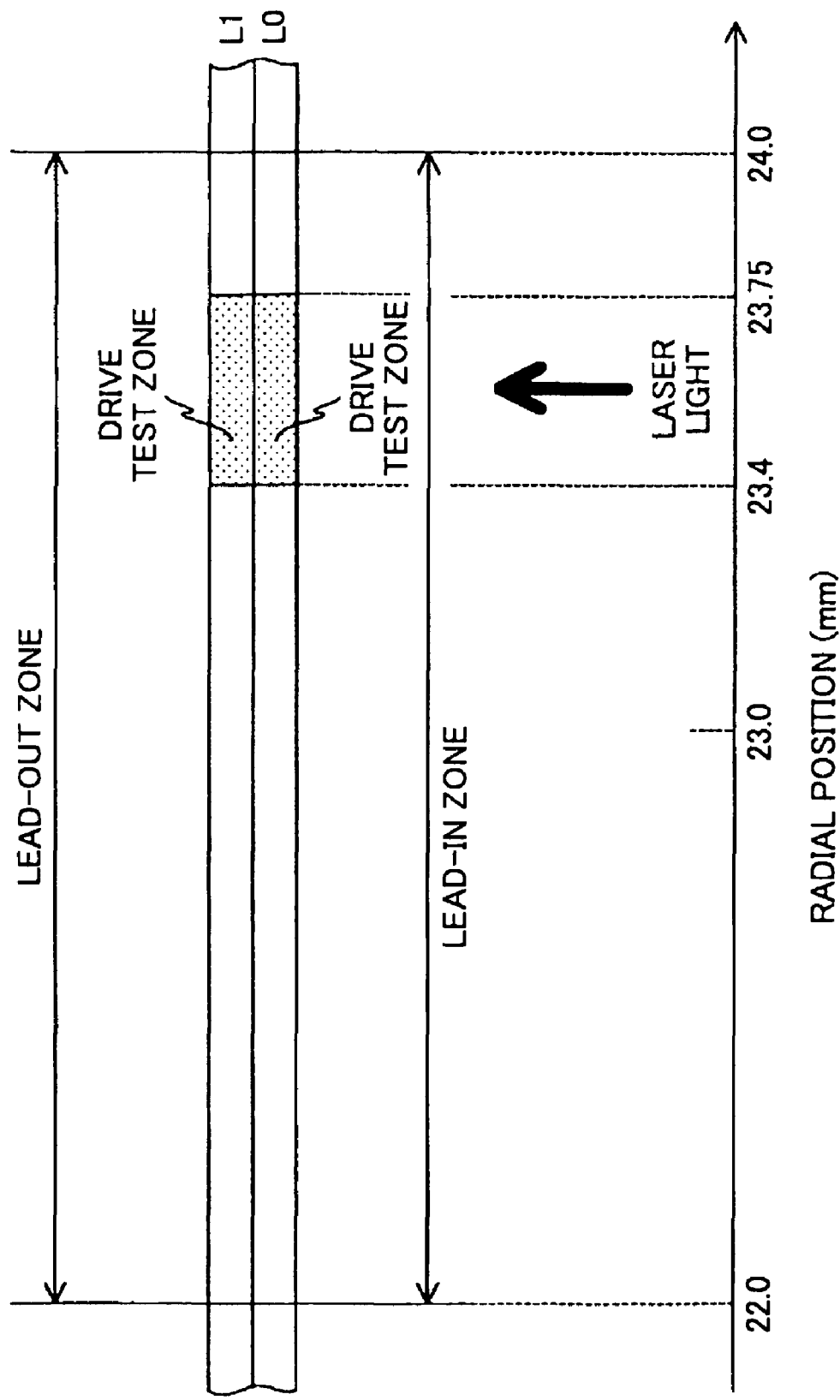
FIG. 8 is a diagram for illustrating PCA in the optical disk of FIG. 2 according to the embodiment of the present invention.

The data zone is provided between radial positions of 24.0 mm and 58.0 mm in each of the layers L0 and L1. By way of example, as shown in FIG. 8, a drive test zone that is the test writing area of the layer L0 is provided in the lead-in zone, and a drive test zone that is the test writing area of the layer L1 is provided in the lead-out zone. Each drive test zone is provided between radial positions of 23.4 mm and 23.75 mm, and the drive test zones are superposed on each other when viewed from the direction of incidence of a light beam.

Figure 9:
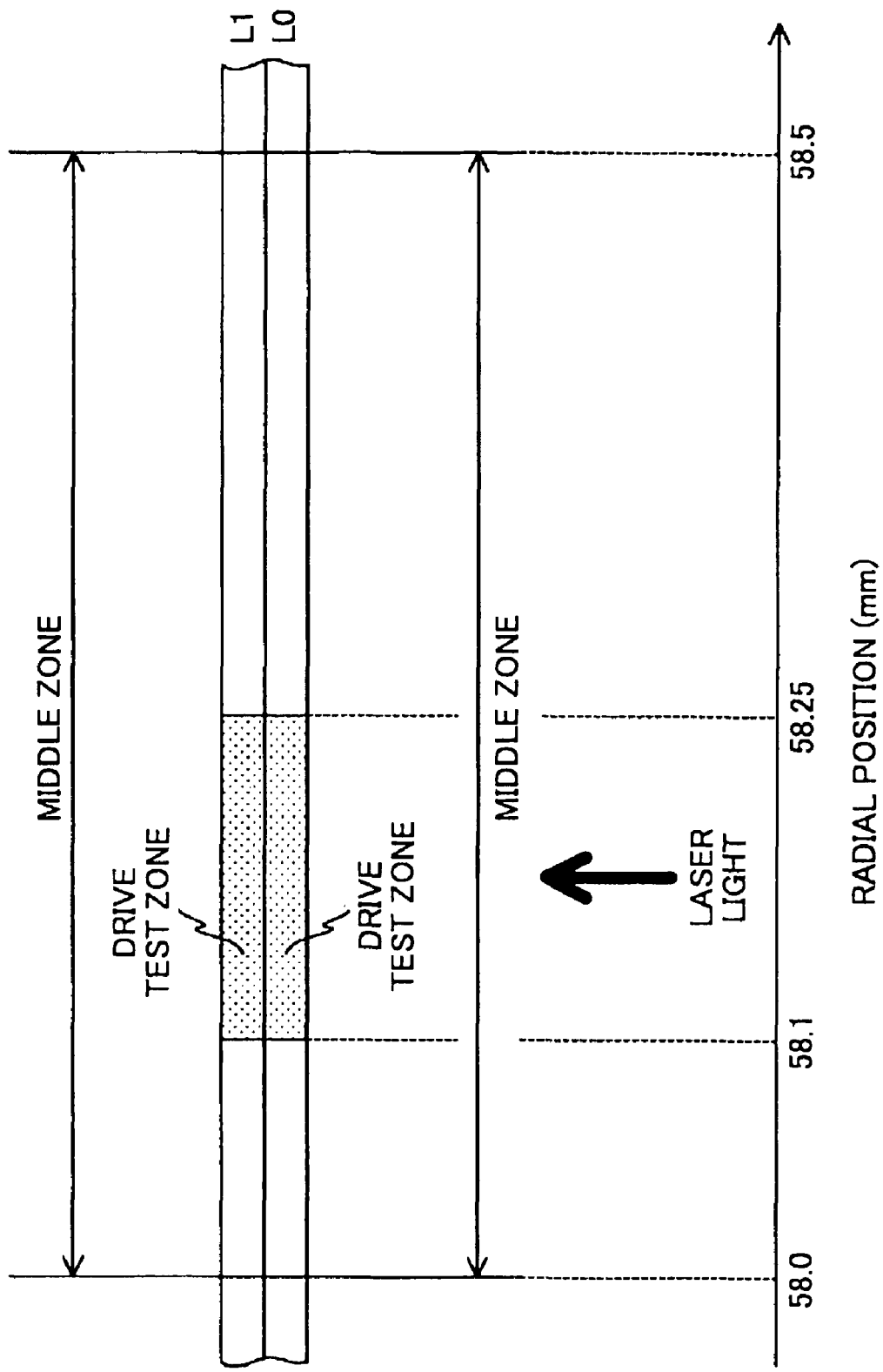
FIG. 9 is another diagram for illustrating the PCA in the optical disk of FIG. 2 according to the embodiment of the present invention.

Further, by way of example, as shown in FIG. 9, a drive test zone that is the test writing area of the layer L0 is provided in the middle zone of the layer L0, and a drive test zone that is the test writing area of the layer L1 is provided in the middle zone of the layer L1. Each drive test zone is provided between radial positions of 58.1 mm and 58.25 mm, and the drive test zones are superposed on each other when viewed from the direction of incidence of a light beam.

That is, here, the test writing area is provided in the center part and the peripheral part of each of the recording layers 3a and 3b. Hereinafter, the drive test zones are also referred to as "PCA (Power Calibration Area)" for convenience.

Figure 10:
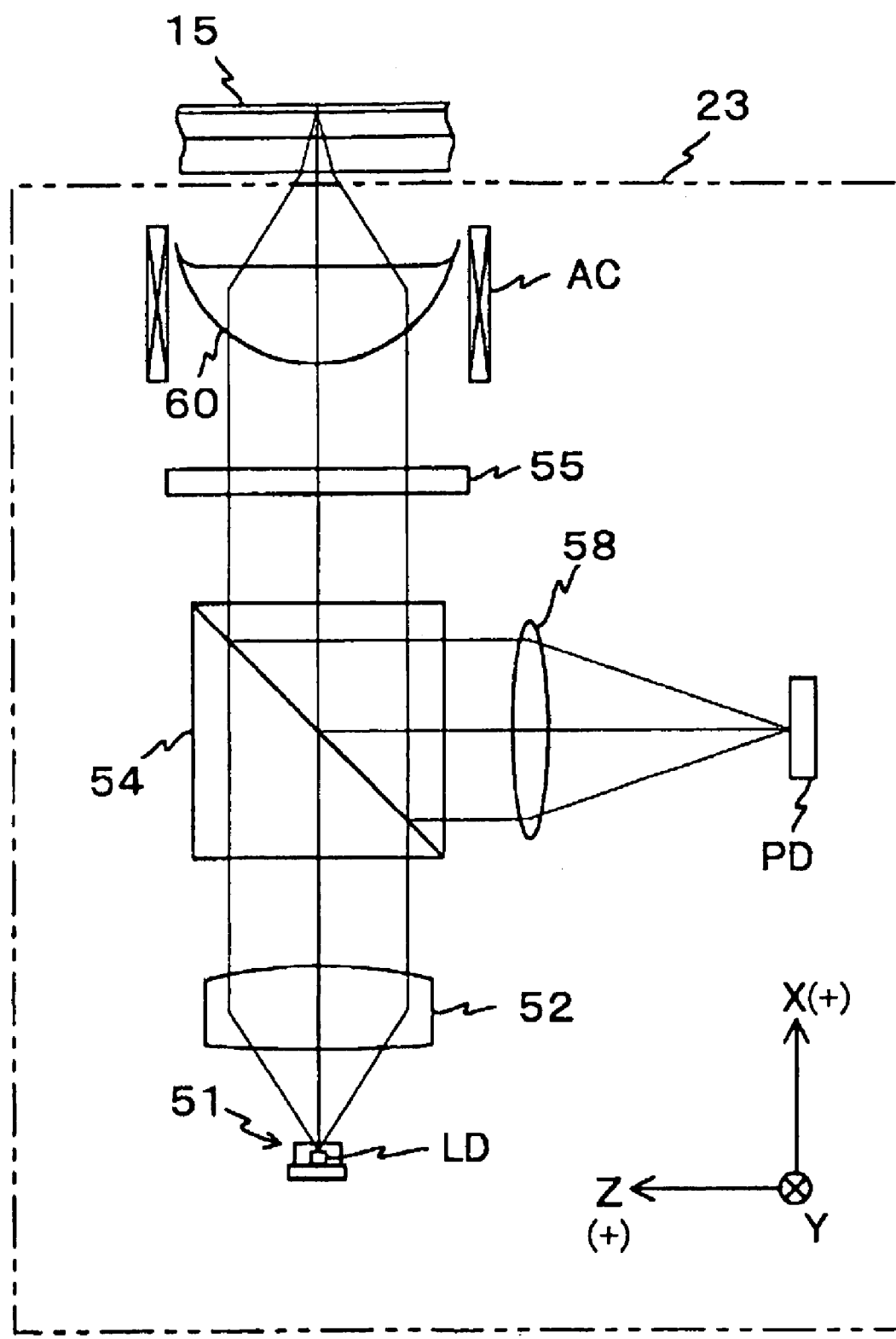
FIG. 10 is a diagram for illustrating an optical pickup unit of the optical disk unit of FIG. 1 according to the embodiment of the present invention.

The optical pickup unit 23 is a device for focusing laser light on one of the two recording layers 3a and 3b of the optical disk 15 which one is a target of access, and receiving reflected light from the optical disk 15. Hereinafter, the one of the two recording layers 3a and 3b of the optical disk 15 which one is a target of access is abbreviated as "target recording layer." By way of example, as shown in FIG. 10, the optical pickup unit 23 includes a light source unit 51, a coupling lens 52, a polarization beam splitter 54, a ¼ wave plate 55, an objective lens 60, a collective lens (detection lens) 58, a light receiver PD serving as a photodetector, and a drive system AC for driving the objective lens 60.

The light source unit 51 includes a semiconductor laser LD serving as a light source to emit laser light of a wavelength corresponding to the optical disk 15 (in this case, approximately 660 nm). In this embodiment, the direction of maximum intensity emission of laser light emitted from the light source unit 51 is a positive (+) X direction indicated by the arrow X in FIG. 10. Further, by way of example, a light beam of polarization parallel to the plane of incidence of the polarization beam splitter 54 (p-polarization) is emitted from the light source unit 51.

The coupling lens 52 is disposed on the positive X side of the light source unit 51 so as to convert the light beam emitted from the light source unit 51 into a substantially parallel beam.

The polarization beam splitter 54 is disposed on the positive X side of the coupling lens 52. The reflectance of the polarization beam splitter 54 differs depending on the polarization state of a light beam made incident thereon. Here, by way of example, the polarization beam splitter 54 is set so as to have low reflectance for p-polarized light and high reflectance for s-polarized light. That is, most of the light beam emitted from the light source unit 51 is allowed to pass through the polarization beam splitter 54. The ¼ wave plate is disposed on the positive X side of the polarization beam splitter 54.

The ¼ wave plate 55 provides a light beam made incident thereon with an optical phase difference of a ¼ wavelength. The objective lens 60 is disposed on the positive X side of the ¼ wave plate, and focuses a light beam passing through the ¼ wave plate on the target recording layer. Here, the NA (numerical aperture) is 0.60.

The collective lens 58 is disposed on the negative (−) Z side of the polarization beam splitter 54 so as to focus a returning light beam diverging in the negative Z direction in the polarization beam splitter 54 on the light-receiving surface of the light receiver PD. The light receiver PD includes multiple light-receiving elements (or light-receiving areas) for generating optimum signals (photoelectrically converted signals) for detecting an RF signal, a wobble signal, and servo signals in the reproduced signal processing circuit 28.

The drive system AC includes a focusing actuator for driving the objective lens 60 minutely in the focus directions, or the optical axis directions of the objective lens 60, and a tracking actuator for driving the objective lens 60 minutely in the tracking directions. Here, for convenience, the optimum position of the objective lens 60 with respect to the focus directions at a time when the target recording layer is the recording layer 3a is referred to as "first lens position," and the optimum position of the objective lens 60 with respect to the focus directions at a time when the target recording layer is the recording layer 3b is referred to as "second lens position."

A description is given of the operation of the optical pickup unit 23 having the above-described structure.

A linearly polarized (p-polarized in this case) light beam emitted from the light source unit 51 is converted into a substantially parallel light beam in the coupling lens 52 and enters the polarization beam splitter 54. Most of the light beam passes as it is through the polarization beam splitter 54 to be circularly polarized in the ¼ wave plate 55, and is focused into a fine spot on the target recording layer of the optical disk 15 through the objective lens 60. Reflected light from the optical disk 15 is circularly polarized in the opposite direction from that of the light beam incident on the optical disk 15 so as to be converted again into a substantially parallel beam in the objective lens 60 as a returning light beam. The returning light beam is converted into a linearly polarized (s-polarized in this case) light beam perpendicular to that emitted from the light source unit 51 in the ¼ wave plate 55. Then, this returning light beam enters the polarization beam splitter 54. The returning light beam 54 is reflected in the negative Z direction in the polarization beam splitter 54, and is received by the light receiver PD through the collective lens 58. In the light receiver PD, photoelectric conversion is performed in each light-receiving element (or light-receiving area), and each photoelectrically converted signal is output to the reproduced signal processing circuit 28.

Referring back to FIG. 1, the reproduced signal processing circuit 28 obtains servo signals (such as a focus error signal and a tracking error signal), address information, synchronization information, and an RF signal based on the output signals (photoelectrically converted signals) of the light receiver PD. The obtained servo signals are output to the drive control circuit 26. The obtained address information is output to the CPU 40. The obtained synchronization signal is output to the encoder 25, the drive control circuit 26, etc. Further, the reproduced signal processing circuit 28 performs decoding and error detection on the RF signal. In the case of detecting error, the reproduced signal processing circuit 28 performs error correction, and thereafter, stores the RF signal in the buffer RAM 34 through the buffer manager 37 as reproduced data. Further, the address information included in the reproduced data is output to the CPU 40.

The drive control circuit 26, based on the tracking error signal fed from the reproduced signal processing circuit 28, generates a tracking actuator driving signal for correcting the position offset of the objective lens 60 with respect to the tracking directions. Further, the drive control circuit 26, based on the focus error signal fed from the reproduced signal processing circuit 28, generates a focusing actuator driving signal for correcting the focus error of the objective lens 60. The generated driving signals are output to the optical pickup unit 23 so that tracking control and focus control are performed. Further, the drive control circuit 26, based on instructions from the CPU 40, generates a driving signal for driving the seek motor 21 and a driving signal for driving the spindle motor 22. The driving signals are output to the seek motor 21 and the spindle motor 22, respectively.

The buffer RAM 34 temporarily stores data to be recorded on the optical disk 15 (recording data) and data reproduced from the optical disk 15 (reproduced data). The buffer manager 37 manages data input to and data output from the buffer RAM 34.

The encoder 25, based on an instruction from the CPU 40, extracts recording data stored in the buffer RAM 34 through the buffer manager 37, performs modulation on the data, and adds an error correction code to the data, thereby generating a write signal for writing onto the optical disk 15. The generated write signal is output to the laser control circuit 24.

The laser control circuit 24 controls the light emission power of the semiconductor laser LD. For example, in the case of recording, a signal to drive the semiconductor laser LD is generated in the laser control circuit 24 based on the write signal, write (recording) conditions, and the light emission characteristics of the semiconductor laser LD.

The interface 38 is a bidirectional communications interface with a host apparatus 90 such as a personal computer, and is compliant with standard interfaces such as ATAPI (AT Attachment Packet Interface), SCSI (Small Computer System Interface), and USB (Universal Serial Bus).

The flash memory 39 stores a variety of programs including one coded in a code decodable by the CPU 40 according to the embodiment of the present invention, and a variety of data including the light emission characteristics of the semiconductor laser LD.

The CPU 40 controls the operation of each of the above-described parts of the optical disk unit 20 in accordance with the programs stored in the flash memory 39, and stores data necessary for the control in the RAM 41 and the buffer RAM 34.

[Recording Operation]

Figure 11:
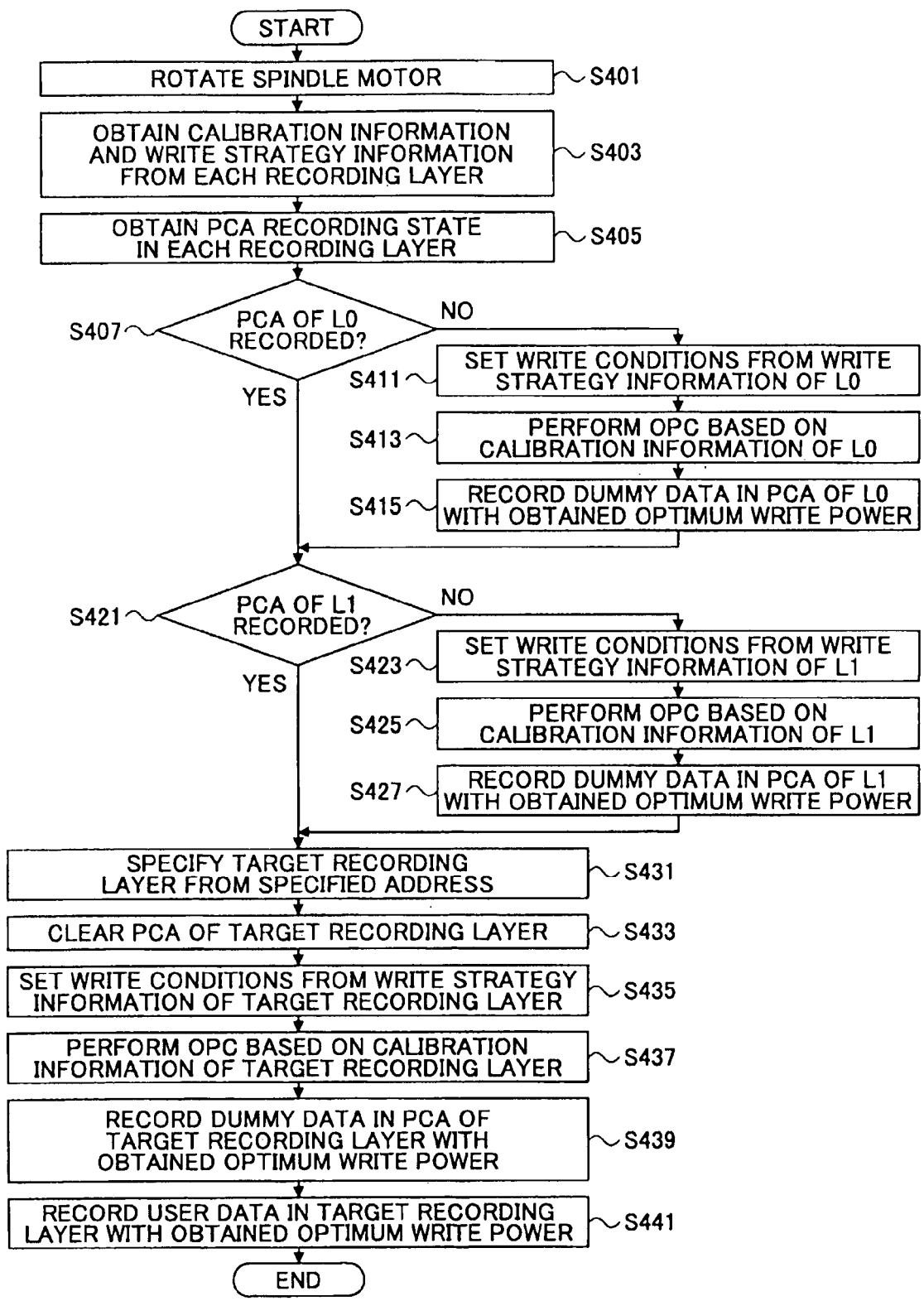
FIG. 11 is a flowchart for illustrating a recording operation according to the embodiment of the present invention.

Next, a description is given, with reference to FIG. 11, of an operation in the optical disk unit 20 at the time of receiving a recording request from the host apparatus 90. The flowchart of FIG. 11 corresponds to a series of processing algorithms executed by the CPU 40. When a recording request (command) is received from the host apparatus 90, the start address of a program stored in the flash memory 39 and corresponding to the flowchart of FIG. 11 (hereinafter referred to as "recording operation algorithm") is set in the program counter of the CPU 40, and a recording operation is started.

First, in step S401, an instruction is given to the drive control circuit 26 so that the optical disk 15 rotates at a predetermined linear velocity (or angular velocity), and the reproduced signal processing circuit 28 is notified of reception of the recording request (command) from the host apparatus 90. By way of example, the write (recording) scanning velocity is 9.19 m/s (2.4 times that in a DVD).

Next, in step S403, calibration conditions and write strategy information recorded on the optical disk 15 are obtained through the reproduced signal processing circuit 28. Here, the reproduced signal processing circuit 28 performs phase demodulation on a wobble signal detected in each layer, and extracts calibration conditions and write strategy information layer by layer.

Next, in step S405, the recording state of PCA in each layer is obtained. Here, detection as to whether the PCA of the layer L0 is recorded or unrecorded (whether recording has been performed on the layer L0) and whether the PCA of the layer L1 is recorded or unrecorded (whether recording has been performed on the layer L1) is performed based on, for example, the intensity of reflected light from each PCA.

Next, in step S407, it is determined whether the PCA of the layer L0 is recorded. If the PCA of the layer L0 is unrecorded (NO in step S407), the operation proceeds to step S411.

In step S411, write conditions are set based on the write strategy information in the layer L0 obtained in step S403. Parameters defining the light emission waveform of the semiconductor laser LD are set in a register (not graphically illustrated) of the laser control circuit 24.

Next, in step S413, an optimum write power (Pw0) is determined by performing OPC based on the calibration information in the layer L0 obtained in step S403. Here, by way of example, Pw0=42 mW is obtained.

Next, in step s415, dummy data is recorded in the PCA of the layer L0 with the optimum write power Pw0 determined in step S413.

Next, in step S421, it is determined whether the PCA of the layer L1 is recorded. If the PCA of the layer L1 is unrecorded (NO in step S421), the operation proceeds to step S423.

In step S423, write conditions are set based on the write strategy information in the layer L1 obtained in step S403.

Next, in step S425, an optimum write power (Pw1) is determined by performing OPC based on the calibration information in the layer L1 obtained in step S403. Here, by way of example, Pw1=50 mW is obtained.

Next, in step S427, dummy data is recorded in the PCA of the layer L1 with the optimum write power Pw1 determined in step S425.

Next, in step S431, the target recording layer is specified from a specified address included in the recording request (command).

Next, in step S433, the PCA of the target recording layer is made "unrecorded." Specifically, laser light of erase power is emitted from the semiconductor laser LD onto the PCA of the target recording layer. That is, so-called DC erasure is performed.

Next, in step S435, write conditions are set based on the write strategy information in the target recording layer obtained in step S403.

Next, in step S437, an optimum write power Pw is determined by performing OPC based on the calibration information in the target recording layer obtained in step S403.

Next, in step S439, dummy data is recorded in the PCA of the target recording layer with the optimum write power Pw determined in step S437.

Next, in step S441, user data is recorded at the requested address of the target recording layer with the optimum write power Pw determined in step S437. When the recording of the user data is completed, the host apparatus 90 is notified of the completion, and the recording operation ends.

In step S407, if the PCA of the layer L0 is recorded (YES in step S407), the operation proceeds to step S421.

In step S421, if the PCA of the layer L1 is recorded (YES in step S421), the operation proceeds to step S431.

When recording was performed with the write conditions shown in FIG. 6, with ten overwrite operations (DOW 10), jitter was 8.6% and the degree of modulation was 0.60 in the layer L0, and jitter was 8.2% and the degree of modulation was 0.68 in the layer L1. Further, with one hundred overwrite operations (DOW 100), jitter was 9.6% in the layer L0 and jitter was 8.5% in the layer L1. In each case, the jitter of each of the layers L0 and L1 was at a level causing no problem in reproduction, being less than 10%. Here, the evaluations were performed using ODU-1000, a DVD evaluation apparatus of Pulstec Industrial Co., Ltd., with a read power of 1.4 mW and a read (reproduction) scanning velocity of 3.83 m/s. The details of jitter and the degree of modulation are described in ECMA-337.

Figure 12:
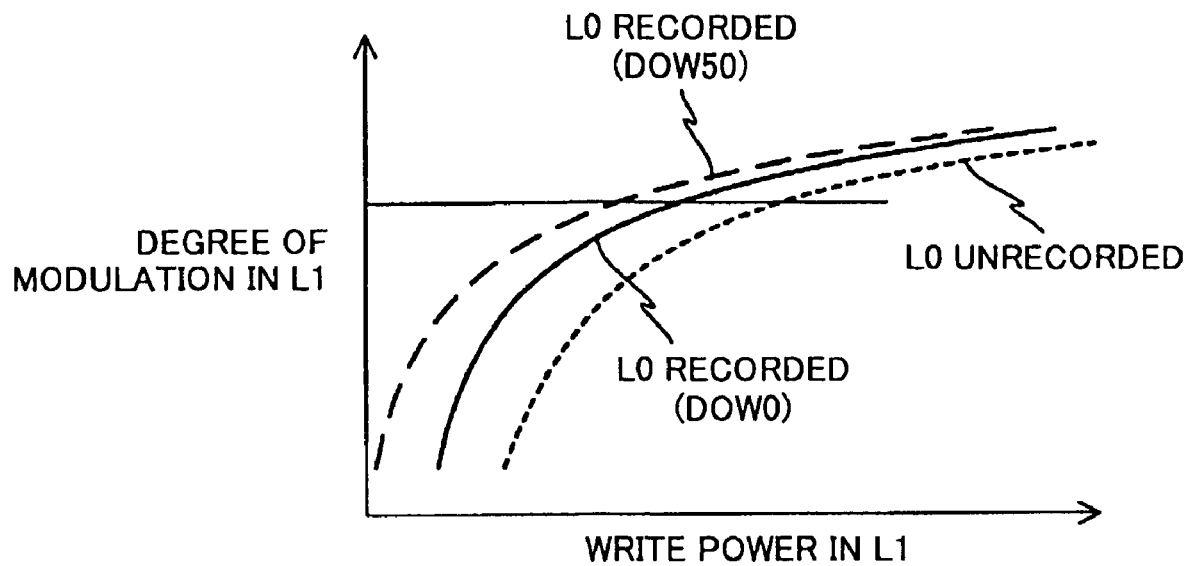
FIG. 12 is a graph for illustrating the effect of the recording state of a layer L0 on the degree of modulation of a layer L1 according to the embodiment of the present invention.

By way of example, as shown in FIG. 12, the write power for obtaining a predetermined degree of modulation in the layer L1 differs depending on the recording state of the layer L0. If the layer L0 is unrecorded, a higher write power is required than in the case where the layer L0 is recorded. This is because T<T', where T is a transmittance in the case where the layer L0 is unrecorded, and T' is a transmittance in the case where the layer L0 is recorded. The write power differs depending on the number of times of overwrite even though the layer L0 is recorded. However, the difference is small.

Figure 13:
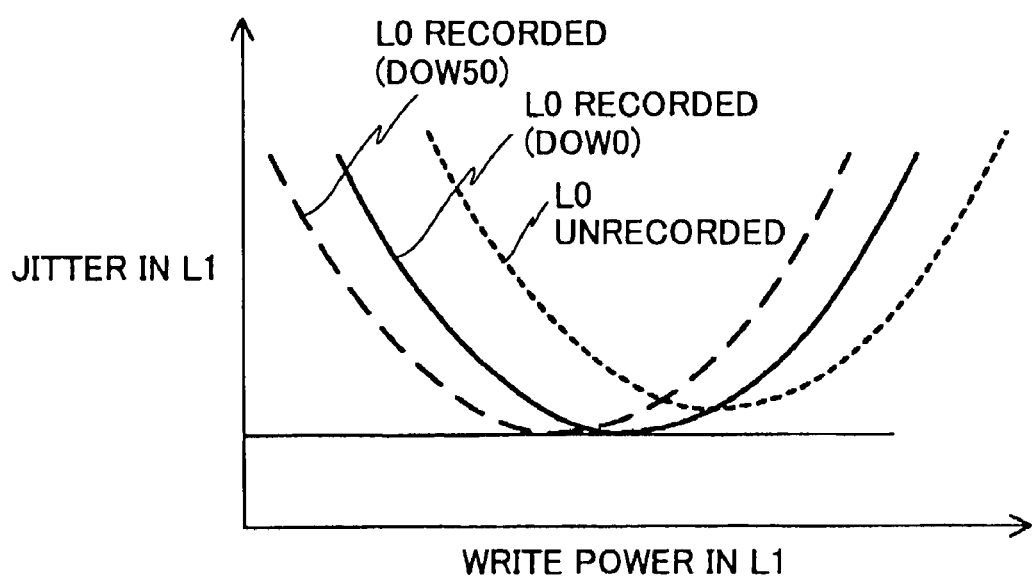
FIG. 13 is a graph for illustrating the effect of the recording state of the layer L0 on the jitter of the layer L1 according to the embodiment of the present invention.

By way of example, as shown in FIG. 13, the write power for maintaining good jitter in the layer L1 also differs depending on the recording state of the layer L0. If the layer L0 is unrecorded, a higher write power is required than in the case where the layer L0 is recorded. The minimum value of jitter is smaller in the case where the layer L0 is recorded than in the case where the layer L0 is unrecorded.

From these, letting the optimum write power in the layer L1 in the case where the layer L0 is unrecorded be $P_0$, and letting the optimum write power in the layer L1 in the case where the layer L0 is recorded be $P_0'$, $P_0$ is greater than $P_0'$ ($P_0 > P_0'$).

Further, letting the intensity of reflected light from the layer L1 in the case where the layer L0 is unrecorded be R, and letting the intensity of reflected light from the layer L1 in the case where the layer L0 is recorded be R', R is less than R' (R<R').

Figure 14:
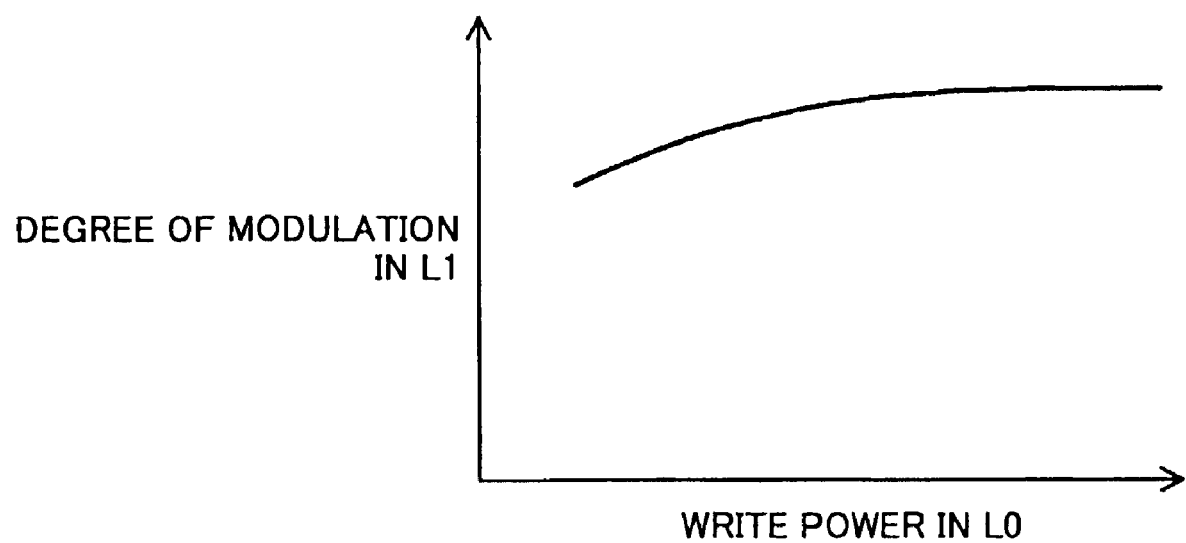
FIG. 14 is a graph for illustrating the effect of the write power of the layer L0 on the degree of modulation of the layer L1 according to the embodiment of the present invention.

Further, by way of example, as shown in FIG. 14, the degree of modulation in the layer L1 varies also because of write power in the layer L0. This is because the size of an amorphous area in the layer L0 differs depending on write power. In the case of FIG. 14, recording is performed in the layer L1 with a constant write power (write power level) after performing recording in the layer L0 with various write powers (write power levels). That is, it is possible to maintain high degrees of modulation in the layer L1 if recording is performed in the layer L0 with high write power.

According to this embodiment, first, OPC is performed on the layer L0 so that dummy data is recorded in the PCA of the layer L0 with optimum write power, and then, OPC is performed on the layer L1 so that dummy data is recorded in the PCA of the layer L1 with optimum write power. Thereafter, optimum write power is determined with respect to the target recording layer by performing OPC thereon. Accordingly, it is possible to determine optimum write power that matches an actual situation of user data recording.

As a comparative example, when OPC was performed in the layer L1 in the same manner as described above with the PCA of the layer L0 being unrecorded, the obtained optimum write power was 55 mW. Then, recording was performed in the layer L0 with a write power of 42 mW, and overwriting was performed 100 times on the layer L1 with a write power of 55 mW. This resulted in a jitter value of 11%. This corresponds to a level more than 100 times of so-called PI error, and may cause reproduction error.

As is apparent from the above description, in the optical disk unit 20 according to this embodiment, the flash memory 39 forms memory, and the encoder 25 and the laser control circuit 24 form a processing unit. Further, the CPU 40 forms a computer for control (controlling computer).

Further, according to this embodiment, of the programs stored in the flash memory 39, the program of the above-described recording operation includes a program according to this embodiment of the present invention.

In the above-described recording operation, a recording method according to this embodiment of the present invention is performed.

As described above, according to the optical disk unit 20 according to this embodiment, at the time of recording user data on the optical disk 15, which is a rewritable single-sided double-layer disk where a test writing area is provided in each recording layer and the test writing areas of the adjacent recording layers are superposed on each other when viewed from the direction of incidence of a light beam, first, OPC is performed on the layer L0 so that dummy data is recorded in the PCA of the layer L0 with optimum write power, and then, OPC is performed on the layer L1 so that dummy data is recorded in the PCA of the layer L1 with optimum write power. Thereafter, OPC is performed on the target recording layer, so that optimum write power is determined with respect to the target recording layer. As a result, it is possible to determine optimum write power whichever of the two recording layers of the optical disk 15 is to have user data recorded therein. As a result, it is possible to perform recording with stable recording quality.

Further, according to the optical disk 15 according to this embodiment, the test writing areas of the adjacent recording layers are superposed on each other in a view from the direction of incidence of a light beam. Accordingly, an optical disk unit in which the optical disk 15 is set can easily determine optimum write power matching an actual situation of user data recording. As a result, it is possible to perform stable recording.

Further, according to the optical disk 15 according to this embodiment, calibration information and write strategy information are "pre-formatted." Accordingly, an optical disk unit in which the optical disk 15 is set can obtain optimum write power swiftly.

In this embodiment, the above description is given of the case where the optical disk 15 is manufactured by the inverted stack method. The manufacturing method of the optical disk 15 is not limited to this, and the optical disk 15 may be manufactured by the so-called 2P method.

Further, in this embodiment, the above description is given of the case where the optical disk 15 has two recording layers. However, the present invention is not limited to this, and the optical disk 15 may have three or more recording layers. In this case, at the time of recording information in, for example, the $N^{th}$ closest recording layer to the light beam entrance surface, OPC is performed in the $N^{th}$ recording layer after converting at least one of the PCA of the $(N-1)^{th}$ recording layer and the PCA of the $(N+1)^{th}$ recording layer into a recorded state (that is, after recording data in at least one of the PCA of the $(N-1)^{th}$ recording layer and the PCA of the $(N+1)^{th}$ recording layer).

Further, in this embodiment, the above description is given of the case where the optical disk 15 is 120 mm in diameter. However, the present invention is not limited to this, and the optical disk 15 may be, for example, 80 mm or 30 mm in diameter.

Further, in this embodiment, the above description is given of the case where each recording layer independently stores calibration information and write strategy information corresponding thereto. However, the present invention is not limited to this, and the calibration information and the write strategy information corresponding to all recording layers may be recorded in one of the recording layers.

Further, in this embodiment, the above description is given of the case where the calibration information and the write strategy information are set recording layer by recording layer. However, the present invention is not limited to this. For example, if the difference in calibration information and write strategy information between recording layers is small, the average calibration information and write strategy information may be set and recorded in one of the recording layers.

Further, in this embodiment, for example, if the range of supportable recording rates is wide, the calibration information may be set recording rate by recording rate.

Further, in this embodiment, for example, if the range of supportable recording rates is wide, the write strategy information may be set recording rate by recording rate.

Further, in this embodiment, the above description is given of the case where the test writing areas of adjacent recording layers are superposed on each other in a view from the direction of incidence of a light beam. Alternatively, the test writing areas of adjacent recording layers may be superposed partly on, or overlap with, each other. In this case, the overlap is preferably at least 50%, and more preferably 70%, of the entire area. In the case of overlapping (partial superposition), it is preferable to perform OPC in the overlapping area.

Further, in this embodiment, the above description is given of the case where the test writing area is provided in each of the center part and the peripheral part of the optical disk 15. However, the present invention is not limited to this, and the test writing area may be provided in one of the center part and the peripheral part of the optical disk 15.

Further, in this embodiment, the above description is given of the case where the test writing area of the center part of the optical disk 15 is provided between radial positions of 23.4 mm and 23.75 mm. However, the present invention is not limited to these radial positions.

Further, in this embodiment, the above description is given of the case where the test writing area of the peripheral part of the optical disk 15 is provided between radial positions of 58.1 mm and 58.25 mm. However, the present invention is not limited to these radial positions.

Further, in this embodiment, the above description is given of the case where 2T write strategy is employed. However, the present invention is not limited to this, and so-called 1T write strategy may be employed.

Further, in this embodiment, the above description is given of the case where the disk layout supports OTP. However, the present invention is not limited to this, and the disk layout may support parallel track path (PTP).

Further, the material and the thickness of each layer of the optical disk 15 may be, but are not limited to, those described above in this embodiment.

(a) As the material of the substrate 1a, other resins such as polyolefin-based and acryl-based resins, and glass may also be employed. That is, materials for the substrate 1a have high transmittance with respect to a light beam emitted from the optical pickup unit 23. In terms of processability and manufacturing cost, however, it is preferable to employ resin.

(b) Inorganic material is preferable as the material of each of the protection layers 2a, 4a, 2b, and 4b. For example, metal or alloy oxides, and simple substances or mixtures of sulfides, nitrides, and carbides may be employed. Further, each of the protection layers 2a, 4a, 2b, and 4b may have a multilayer structure. The material of each of the protection layers 2a, 4a, 2b, and 4b is required to have a melting point higher than that of the material of the recording layer 3a, and at the same time, appropriate toughness. Further, the material of each of the protection layers 2a, 4a, 2b, and 4b is required to have transparency in the wavelength range of an incident light beam. Materials satisfying these conditions include, in addition to ZnS and $SiO_2$, MgO, $Al_2O_3$, SiO, $ZnO_2$, $InO_2$, $SnO_2$, $TiO_2$, $ZrO_2$, $Y_2O_3$, AlN, $Si_3N_4$, GaN, GeN, SiC, TiC, and TaC.

(c) The optimum film thickness of the lower protection layer 2a, which is determined by reflectance and recording sensitivity, preferably falls within the range of 40 nm to 300 nm.

(d) Since it is necessary to ensure a predetermined transmittance in the recording layer 3a, the recording layer 3a should be reduced in film thickness compared with the case of a single-layer disk having one recording layer. In general, however, a thinner phase change material tends to have a lower rate of crystallization. Accordingly, phase change materials employed in high-speed compliant optical disks such as 8× (scanning velocity: 27.9 m/s) single-layer DVD+RWs are preferable. Specifically, an In—Sb alloy, Ga—Sb alloy, and Ge—Sb alloy with a third metal added thereto may be used.

(e) The optimum film thickness of the upper protection layer 4a, which is determined by thermal design, preferably falls within the range of 4 nm to 50 nm.

(f) The material of the semi-transparent layer 5 may also be an alloy whose principal component is Au, Ag, Al, or Cu. Alternatively, the material of the semi-transparent layer 5 may also be a simple substance of Au, Ag, or Al.

(g) The optimum film thickness of the semi-transparent layer 5, which is determined from transmittance and reflectance, preferably falls within the range of 2 nm to 50 nm. More preferably, the optimum film thickness of the semi-transparent layer 5 falls within the range of 5 nm to 15 nm particularly in order to ensure transmittance. If the semi-transparent layer 5 exceeds 50 nm in film thickness, it becomes difficult to ensure reflectance in the layer L1. If the semi-transparent layer 5 is less than 2 nm in film thickness, insufficient thermal diffusion results, so that rapid cooling of the recording layer 3a is hindered. This increases the possibility of a decrease in recording sensitivity and deterioration of jitter.

(h) Materials for the intermediate layer 6 have transparency in the wavelength range of an incident light beam and high thermal conductivity. For example, a simple substance or mixture of $In_2O_3$, $SnO_2$, $ZnO_2$, or $Ga_2O_3$ with a dopant added thereto is usually employed. The dopant may be Al, Ga, B, In, Y, Sc, F, V, Si, Ge, Ti, Zr, Hf, Sb, Mo, etc.

(i) The optimum film thickness of the intermediate layer 6, which is determined by thermal design and optical design, preferably falls within the range of 10 nm to 300 nm, more preferably, the range of 50 nm to 200 nm.

(j) The material of the reflective layer 8 may also be an alloy whose principal component is Ag, Au, Cu, or Al. Alternatively, the material of the reflective layer 8 may be a simple substance of Au, Cu, or Al.

(k) Materials for the adhesive layer 7 do not corrode an adjacent layer and have transparency in the wavelength range of an incident light beam.

(l) The optimum thickness of the adhesive layer 7, which is determined so that interlayer crosstalk and wave front aberration are at or below predetermined levels, preferably falls within the range of 40 nm to 70 nm.

Further, in this embodiment, the program according to the present invention is recorded in the flash memory 39. Alternatively, the program may be recorded in other recording media such as a CD, magneto-optical disk, DVD, memory card, USB memory, and flexible disk. In this case, the program is loaded into the flash memory 39 through a reproduction apparatus (or dedicated interface) corresponding to a recording medium in which the program is recorded. The program may be forwarded to the flash memory 39 through a network such as a LAN, an intranet, or the Internet. That is, the program according to the present invention is stored in the flash memory 39.

Further, in this embodiment, the above description is given of the case where the optical disk 15 is a DVD-type information recording medium. However, the present invention is not limited to this, and the optical disk 15 may be, for example, a CD-type rewritable single-sided multilayer disk or a rewritable single-sided multilayer disk corresponding to a light beam of 405 nm wavelength. In this case, for example, the track pitch is 1.6 μm for a CD for which NA=0.5 and λ (wavelength)=780 nm, and is 0.4 μm for an HD DVD for which NA=0.65 and λ=405 nm.

Further, in this embodiment, the above description is given of the case where the optical pickup unit 23 has one semiconductor laser. However, the present invention is not limited to this, and for example, the optical pickup unit 23 may have multiple semiconductor lasers emitting respective light beams different in wavelength from each other. In this case, the optical pickup unit 23 may include at least one of, for example, a semiconductor laser emitting a light beam of a wavelength of approximately 405 nm, a semiconductor laser emitting a light beam of a wavelength of approximately 660 nm, and a semiconductor laser emitting a light beam of a wavelength of approximately 780 nm. That is, the optical disk unit 20 may support multiple types of optical disks compliant with respective standards different from each other. In this case, at least one of the multiple types of optical disks may be a rewritable single-sided multilayer disk.

As described above, the optical disk 15 according to this embodiment has multiple rewritable recording layers, and is suitable for stable recording and reproduction. Further, the recording method and the optical disk unit 20 according to this embodiment are suitable for performing recording on the optical disk 15 of this embodiment with stable recording quality. Further, the program and the recording medium according to this embodiment are suitable for causing the optical disk unit 20 to perform recording on the optical disk 15 of this embodiment with stable recording quality.

According to one embodiment of the present invention, a single-sided multilayer optical disk including multiple information rewritable recording layers each having a spiral track or concentric tracks formed thereon is provided, wherein a test writing area to be used for calibration of write power is provided in each of the recording layers, and the test writing areas of adjacent two of the recording layers are superposed at least partly on each other in a view from the direction of incidence of a light beam.

This optical disk allows an optical disk unit in which the optical disk is set to perform positioning swiftly at the time of performing test writing in one recording layer after another, and accordingly, to calibrate write power in each recording layer in a short period of time. As a result, it is possible to perform stable recording even if the optical disk has multiple rewritable recording layers.

According to one embodiment of the present invention, a method of recording information on a single-sided multilayer optical disk is provided that includes the step of, before performing test writing in a first one of the test writing areas of the recording layers in the optical disk except the recording layer closest to a light beam entrance surface, recording data in a second one of the test writing areas adjacent to the first one of the test writing areas on its light beam entrance surface side, thereby converting the second one of the test writing areas into a recorded state.

According to this method, before performing test writing in a first one of the test writing areas of recording layers in an optical disk except the recording layer closest to a light beam entrance surface, a second one of the test writing areas adjacent to the first one of the test writing areas on its light beam entrance surface side is converted into a recorded state. Accordingly, it is possible to determine an optimum write power matching a situation where user data is actually recorded, so that it is possible to perform recording with stable recording quality.

According to one embodiment of the present invention, a method of recording information on a single-sided multilayer optical disk is provided that includes the step of, before performing test writing in a first one of the test writing areas of the recording layers in the optical disk except the recording layer most remote from a light beam entrance surface, recording data in a second one of the test writing areas adjacent to the first one of the test writing areas on the opposite side from the light beam entrance surface, thereby converting the second one of the test writing areas into a recorded state.

According to this method, before performing test writing in a first one of the test writing areas of recording layers in an optical disk except the recording layer most remote from a light beam entrance surface, a second one of the test writing areas adjacent to the first one of the test writing areas on the opposite side from the light beam entrance surface is converted into a recorded state. Accordingly, it is possible to suppress the adverse effect of so-called interlayer crosstalk, so that it is possible to perform recording with stable recording quality.

According to one embodiment of the present invention, a computer-readable recording medium on which recorded is a program for causing a computer to execute any of the above-described methods of recording information on a single-sided multilayer optical disk is provided.

According to this computer-readable recording medium, when the program is loaded into a predetermined memory, and its start address is set in a program counter, the controlling computer of an optical disk unit, before performing test writing in a first one of the test writing areas of recording layers in an optical disk except the recording layer closest to a light beam entrance surface, changes a second one of the test writing areas adjacent to the first one of the test writing areas on its light beam entrance surface side into a recorded state. Alternatively, the controlling computer, before performing test writing in a first one of the test writing areas of the recording layers except the recording layer remotest from a light beam entrance surface, may change a second one of the test writing areas adjacent to the first one of the test writing areas on the opposite side from the light beam entrance surface into a recorded state. Thus, it is possible to cause the controlling computer of the optical disk unit to execute any of the above-described recording methods of recording information on the optical disk, so that it is possible to perform recording with stable recording quality.

According to one embodiment of the present invention, an optical disk unit capable of recording information on a single-sided multilayer optical disk is provided that includes a memory, an optical pickup unit configured to emit a light beam onto the optical disk, a controlling computer, and a processing unit, wherein the memory stores a program for causing the controlling computer to execute any of the above-described methods of recording information on the optical disk; the controlling computer obtains an optimum recording condition for the optical disk in accordance with the program stored in the memory; and the processor unit records the information on the optical disk with the optimum recording condition through the optical pickup unit.

According to this optical disk unit, the controlling computer executes a program, recorded in the memory, for causing the controlling computer to execute any of the above-described methods of recording the information on the optical disk, so that an optimum recording condition is obtained. The processing unit records the information on the optical disk with the optimum recording condition through an optical pickup unit. In this case, the controlling computer obtains an optimum recording condition whichever recording layer of the optical disk is to have information recorded therein. As a result, it is possible to perform recording on the optical disk with stable recording quality.

The present invention is not limited to the specifically disclosed embodiment, and variations and modifications may be made without departing from the scope of the present invention.

The present application is based on Japanese Priority Patent Application No. 2005-153872, filed on May 26, 2005, the entire contents of which are hereby incorporated by reference.

The invention claimed is:

1. A method of recording information using a laser on a multilayer optical disk having a plurality of recording layers, the plurality of recording layers including a first recording layer and a second recording layer, the second recording layer being a recording layer adjacent the first recording layer, the first recording layer having a first test writing area to be used for calibration of write power and the second recording layer having a second test writing area to be used for calibration of write power, wherein the first test writing area is completely superposed with the second test writing area when considered in the direction in which the laser is arranged to irradiate, the method comprising:

if a second region of the second test writing area is unrecorded, recording data in the second region of the second test writing area, thereby converting the second region of the second test writing area into a recorded state;

once the second region of the second test writing area has been converted into a recorded state, performing test writing in a first region of the first test writing area; and wherein before performing the test writing in the first region of the first test writing area, if the first region of the first test writing area is unrecorded, the method comprises: recording data in the first region of the first test writing area, thereby converting the first region of the first test writing area into a recorded state, and then clearing the first region of the first test writing area; and wherein the clearing of the first region of the first test writing area comprises performing an erasure operation to make the first region unrecorded; and wherein the method further includes the step of recording dummy data in the first recording layer, and wherein the step of recording dummy data in the first recording layer occurs subsequent to the step of performing the test writing in the first region of the first test writing area.

2. A method of recording information using a laser on a multilayer optical disk having a plurality of recording layers, the plurality of recording layers including a first recording layer and a second recording layer, the second recording layer being a recording layer adjacent the first recording layer, the first recording layer having a first test writing area to be used for calibration of write power and the second recording layer having a second test writing area to be used for calibration of write power, wherein the first test writing area is completely superposed with the second test writing area when considered in the direction in which the laser is arranged to irradiate, the method comprising:
  if a second region of the second test writing area is unrecorded, recording data in the second region of the second test writing area, thereby converting the second region of the second test writing area into a recorded state;
  once the second region of the second test writing area has been converted into a recorded state, performing test writing in a first region of the first test writing area; and
  wherein, before performing the test writing in the first region of the first test writing area, the method comprises clearing the first region of the first test writing area; and
  wherein the clearing of the first region of the first test writing area comprises performing an erasure operation to make the first region unrecorded; and
  wherein the method further includes the step of recording dummy data in the first recording layer, and wherein the step of recording dummy data in the first recording layer occurs subsequent to the step of performing the test writing in the first region of the first test writing area.

3. A method according to claim 1 or claim 2, wherein the second recording layer is the next recording layer with respect to the first recording layer in the direction in which the laser is arranged to irradiate.

4. A method according to claim 1 or claim 2, wherein for the first region of the first test writing area, or the second region of the second test writing area, the respective step of recording data in the region thereby converting the region into a recorded state comprises performing an operation to make the region logically zero.

5. A method according to claim 2, wherein before performing the test writing in the first region of the first test writing area, if the first region of the first test writing area is unrecorded, the method comprises; recording data in the first region of the first test writing area, thereby converting the first region of the first test writing area into a recorded state; and then clearing the first region of the first test writing area.

6. A method of recording information using a laser on a multilayer optical disk having a plurality of recording layers including a first recording layer and a second recording layer adjacent to the first recording layer, the first recording layer and the second recording layer including a first test writing area and a second test writing area to be used for calibration of write power, respectively, the first test writing area is completely superposed with the second test writing area when considered in a direction in which the laser is arranged to irradiate, the method comprising:
  converting the second test writing area into a recorded state by recording dummy data in the second test writing area if the second test writing area is unrecorded;
  converting the first test writing area into a recorded state by recording dummy data in the first test writing area if the first test writing area is unrecorded;
  once the first and second test writing areas are converted into the recorded state, clearing one of the first and second test writing areas corresponding to one of the first and second recording layers specified for recording user data;
  performing test writing in the cleared one of the first and second test writing areas; and
  recording dummy data in the cleared one of the first and second test writing areas based on a result of the test writing.

7. The method as claimed in claim 6, wherein said clearing clears the one of the first and second test writing areas by erasing the recorded dummy data from the one of the first and second test writing areas.

8. The method as claimed in claim 7, further comprising: recording the user data in the specified one of the first and second recording layers based on the result of the test writing after recording the dummy data in the cleared one of the first and second test writing areas.

* * * * *